United States Patent
Nvs et al.

(10) Patent No.: US 11,875,496 B2
(45) Date of Patent: Jan. 16, 2024

(54) DIMENSION ESTIMATION USING DUPLICATE INSTANCE IDENTIFICATION IN A MULTIVIEW AND MULTISCALE SYSTEM

(71) Applicant: Genpact Luxembourg S.à r.l. II, Luxembourg (LU)

(72) Inventors: Abhilash Nvs, Bhubaneswar (IN); Ankit Sati, New Delhi (IN); Payanshi Jain, Jaipur (IN); Koundinya K. Nvss, Tirupati (IN); Rajat Katiyar, Lucknow (IN); Mohiuddin Khan, Bangalore (IN); Chirag Jain, Bangalore (IN); Sreekanth Menon, Bangalore (IN)

(73) Assignee: Genpact Luxembourg S.à r.l. II, Luxembourg (LU)

(*) Notice: Subject to any disclaimer, the term of this patent is extended or adjusted under 35 U.S.C. 154(b) by 337 days.

(21) Appl. No.: 17/412,045

(22) Filed: Aug. 25, 2021

(65) Prior Publication Data
US 2023/0063002 A1    Mar. 2, 2023

(51) Int. Cl.
*G06T 7/00* (2017.01)
*G06T 7/11* (2017.01)
(Continued)

(52) U.S. Cl.
CPC ............ *G06T 7/0002* (2013.01); *G06F 18/22* (2023.01); *G06T 7/11* (2017.01); *G06T 7/62* (2017.01);
(Continued)

(58) Field of Classification Search
CPC . G06T 7/0002; G06T 7/11; G06T 7/62; G06T 2207/20081; G06T 2207/20221;
(Continued)

(56) References Cited

U.S. PATENT DOCUMENTS

| 8,792,728 B2 | 7/2014 | Tang et al. |
| 9,342,755 B2 | 5/2016 | Cantley et al. |

(Continued)

FOREIGN PATENT DOCUMENTS

| DE | 10210813 A1 | 10/2003 |
| WO | WO-2007/041565 A2 | 4/2007 |
| WO | WO-2013/059599 A1 | 4/2013 |

OTHER PUBLICATIONS

A. Barari et al., "Duplicate Instance Identification In Multiview And Multiscale Systems," 2020 IEEE Sixth International Conference on Multimedia Big Data (BigMM), 2020, pp. 37-44.
(Continued)

*Primary Examiner* — Van D Huynh
(74) *Attorney, Agent, or Firm* — Goodwin Procter LLP

(57) ABSTRACT

A method for dimension estimation based on duplication identification. In some embodiments, the method includes receiving a set of images of an object. The method then includes detecting, using a first machine learning system trained to perform image segmentation, a first image segmentation representing a damage of the object on a first image and a second image segmentation representing a damage of the object on a second image. The method further includes determining, using a second machine learning system trained to perform dimension estimation, a first dimension for the damage represented by the first image segmentation and a second dimension for the damage represented by the second image segmentation. The method includes determining whether the first and second image segmentations represent a same damage. If these image segmentations represent the same damage, the method intelligently combines the first and second dimensions to obtain a final dimension for the damage.

20 Claims, 23 Drawing Sheets

(51) Int. Cl.
*G06T 7/62* (2017.01)
*G06F 18/22* (2023.01)
(52) U.S. Cl.
CPC .............. *G06T 2207/20081* (2013.01); *G06T 2207/20221* (2013.01); *G06T 2207/30252* (2013.01)
(58) Field of Classification Search
CPC . G06T 2207/30252; G06T 2207/20084; G06T 2207/30136; G06T 7/0004; G06F 18/22
See application file for complete search history.

(56) References Cited

U.S. PATENT DOCUMENTS

| | | | |
|---|---|---|---|
| 9,489,743 | B2 | 11/2016 | Spector et al. |
| 9,530,072 | B2 | 12/2016 | Dwan et al. |
| 2007/0239756 | A1 | 10/2007 | Li et al. |
| 2014/0100813 | A1 | 4/2014 | Showering |
| 2018/0260793 | A1* | 9/2018 | Li ..................... G06Q 40/08 |
| 2019/0251395 | A1* | 8/2019 | Zhang ................. G06N 7/01 |
| 2019/0304099 | A1* | 10/2019 | Hever ................ G06V 10/764 |
| 2020/0034958 | A1* | 1/2020 | Campbell ............ G06Q 10/10 |
| 2020/0074222 | A1* | 3/2020 | Guo ..................... G06N 3/08 |
| 2020/0111203 | A1* | 4/2020 | Tan ................. G06V 10/806 |
| 2020/0273001 | A1* | 8/2020 | Taliwal ............... G06T 7/0004 |
| 2021/0019872 | A1* | 1/2021 | Kang ................. G06V 10/40 |
| 2021/0081704 | A1 | 3/2021 | Lakemond et al. |
| 2021/0182713 | A1* | 6/2021 | Kar ................. G06V 10/764 |
| 2021/0209836 | A1* | 7/2021 | Holzer ................. G06T 17/00 |
| 2021/0241439 | A1* | 8/2021 | Lutich ................ G06V 10/764 |
| 2021/0272271 | A1* | 9/2021 | Ranca ................ G06N 3/08 |
| 2021/0312702 | A1* | 10/2021 | Holzer ................. H04N 23/64 |
| 2022/0148050 | A1* | 5/2022 | Gandhi ................. G06Q 10/20 |
| 2022/0358775 | A1* | 11/2022 | Hantehzadeh ........ G06T 3/0093 |

OTHER PUBLICATIONS

A. Barari, et al., "Accurate Damage Dimension Estimation in AI Driven Vehicle Inspection System," In: Babu R.V., Prasanna M., Namboodiri V.P. (eds) Computer Vision, Pattern Recognition, Image Processing, and Graphics. NCVPRIPG 2019. Communications in Computer and Information Science, (2002), vol. 1249:154-162.

A. Krizhevsky, et al., ImageNet classification with deep convolutional neural networks, Communications of the ACM, 2012, vol. 60, pp. 84-90.

A. Pavuir and N Abhilash, "Deep Learning and Computer Vision based Damage Analysis for Auto Insurance Claims," Data Science and Insights Genpact, 4 pages, 2018.

Abhilash, et al., "AI driven Automatic Vehicle Damage Assessment for Auto Insurance and Auto Finance Industry," Data Science & Insights Genpact, 6 pages, 2019.

Chen, et al., "DeepLab: Semantic Image Segmentation with Deep Convolutional Nets, Atrous Convolution, and Fully Connected CRFs," IEEE Trans Pattern Anal Mach Intell. Apr. 2018;40(4):834-848.

Cortes, C. and Vapnik, V., "Support-vector networks." Mach Learn 20, 273-297 (1995).

D. Duan, et al., "An improved Hough transform for line detection," 2010 International Conference on Computer Application and System Modeling (ICCASM 2010), 2010, pp. V2-354-V2-357.

F. Samadzadegan, H. Rastiveisi, "Automatic Detection and Classification of Damaged Buildings, Using High Resolution Satellite Imagery and Vector Data," The International Archives of the Photogrammetry, Remote Sensing and Spatial Information Sciences. vol. XXXVII. Part B8. Beijing 2008, 415-420.

F. Yamazaki, et al., "Damage Detection from High-Resolution Satellite Images for the 2003 Boumerdes, Algeria Earthquake," Aug. 1-6, 2004, Paper No. 2595, pp. 1-13.

François Chollet, "Xception: Deep Learning with Depthwise Separable Convolutions," Google, Inc., Apr. 4, 2017, 8 pages.

J. Cha et al., "Extended Hough transform for linear feature detection", Pattern Recognition, 39, 2006, 1034-1043.

J. Deng, et al., "ImageNet: A large-scale hierarchical image database," 2009 IEEE Conference on Computer Vision and Pattern Recognition, 2009, pp. 248-255.

K. He, et al., "Deep Residual Learning for Image Recognition," 2016 IEEE Conference on Computer Vision and Pattern Recognition (CVPR), 2016, pp. 770-778.

K. Patil, et al., "Deep Learning Based Car Damage Classification," 2017 16th IEEE International Conference on Machine Learning and Applications (ICMLA), 2017, pp. 50-54.

X. Chen, et al., "Detect What You Can: Detecting and Representing Objects Using Holistic Models and Body Parts," 2014 IEEE Conference on Computer Vision and Pattern Recognition, 2014, pp. 1979-1986, doi: 10.1109/CVPR.2014.254.

Zhihu Huang and Jinsong Leng, "Analysis of Hu's moment invariants on image scaling and rotation," 2010 2nd International Conference on Computer Engineering and Technology, 2010, pp. V7-476-V7-480.

* cited by examiner (a) Centroids for Fig. 10A-(a)

(b) Centroids for Fig. 10A-(b)

(c) Homographic transformation of Fig. 10A-(b) using the four points obtained from Fig. 10A-(a)

US 11,875,496 B2

DIMENSION ESTIMATION USING DUPLICATE INSTANCE IDENTIFICATION IN A MULTIVIEW AND MULTISCALE SYSTEM

TECHNICAL FIELD

This disclosure relates to a method and system for identifying duplicate instances of an object of interest and estimating a physical dimension of the object of interest.

BACKGROUND

Multiview systems, where multiple cameras capture the same scene, are widely used in applications such as surveillance systems, public security systems, video-assisted refereeing, umpiring in sports, etc. It becomes increasingly popular to use the multiview systems to collect a vast amount of information in the applications for reliable data analysis, three-dimensional reconstructions, or implementation of other tasks. For each of these implementations, the same instance of an object of interest is required to be segmented in the multiple images that are captured from different angles and different zoom settings. In other words, reliable identification of duplicate instances of the object of interest from the multiple images is required to avoid double counting and overcompensating. The existing duplication identification methods, however, are complex and time-consuming. Another challenge is accurate physical dimension detection for an object by merely using images of the object obtained in a multiview system. This is particularly complicated when the images are captured by mobile devices in an uncontrolled environment.

An object or physical structure may be a vehicle, a boat, machinery in an industrial plant, a building, etc. The object may often get damaged due to collisions, other accidents, storms, etc. When de-duplicating damage instances and estimating physical dimensions of damage (i.e., an object of interest) for damage assessment (e.g., obtaining vehicle damage information for an auto insurance claim process), the existing approaches face additional challenges such as lack of automation, undesired delay, unreliable cost estimation, etc.

SUMMARY

To address the aforementioned shortcomings, a method and a system for identifying duplicate instances of an object of interest and estimating a physical dimension of the object of interest is provided. The method receives a set of images of an object. The method then detects, using a first machine learning system trained to perform image segmentation, from a first image in the set of images, a first image segmentation representing a damage of the object on the first image. The method also detects, using the first machine learning system trained to perform image segmentation, from a second image in the set of images, a second image segmentation representing a damage of the object on the second image. The method determines, using a second machine learning system trained to perform dimension estimation, a first dimension for the damage represented by the first image segmentation and a second dimension for the damage represented by the second image segmentation. The method further determines whether the first image segmentation and the second image segmentation represent the same damage of the object based on a similarity index between the first image segmentation and the second image segmentation. Responsive to determining that the first image segmentation and the second image segmentation represent the same damage, the method intelligently combines the first dimension and the second dimension to obtain a final dimension for the damage of the object.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
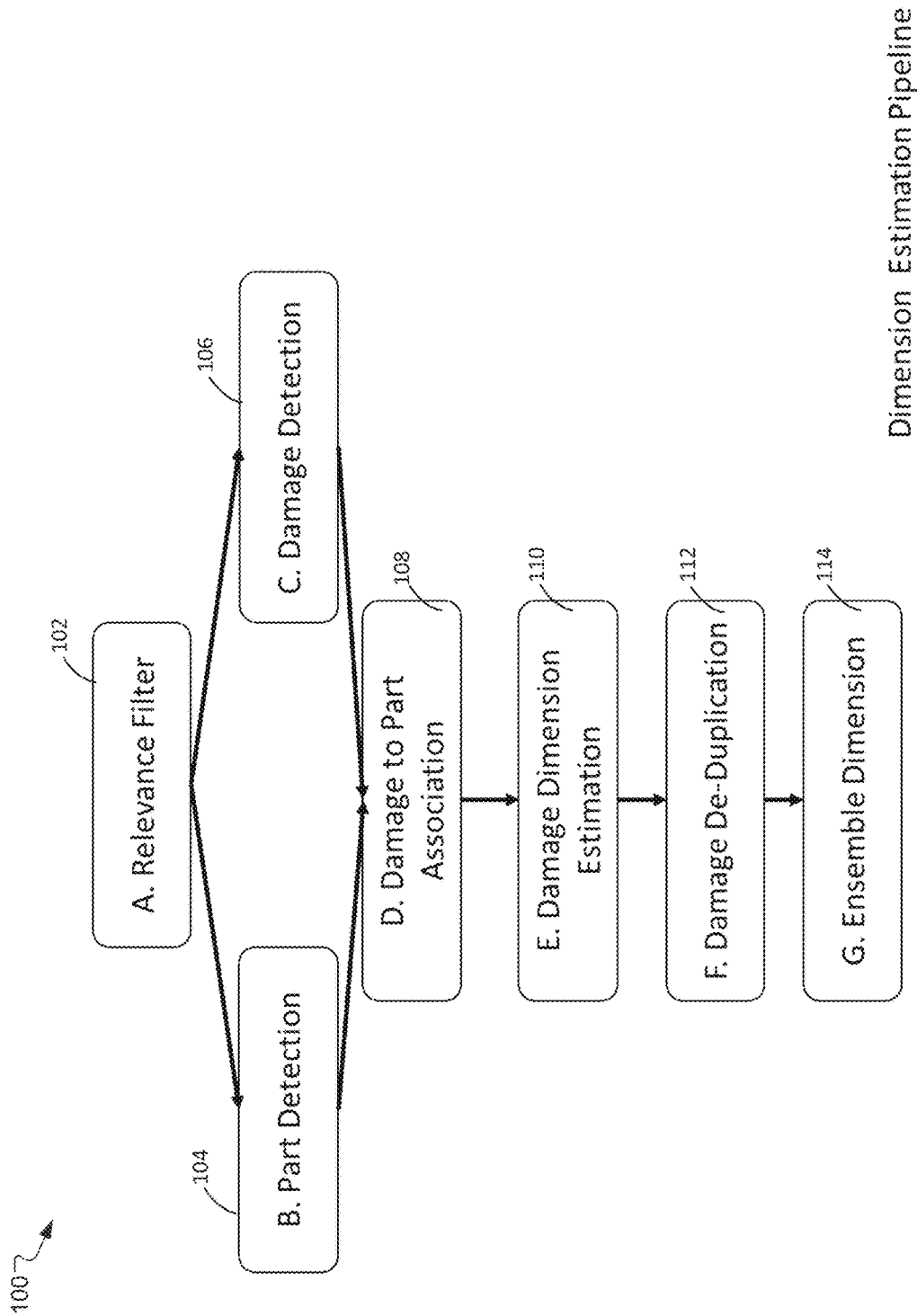
FIG. 1 illustrates an exemplary high-level dimension estimation process, according to some embodiments.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Various embodiments described herein feature a technique for the processing and analysis of images of physical structures/objects in order to assess the damage to the structures. The analysis is performed by one or more artificial intelligence (AI) based models/systems and/or one or more machine learning (ML) models/systems trained to identify duplicate instances of an image structural change, such as damage to the structure, and to estimate physical dimensions of the change/damage. The discussion below uses a vehicle/car as an example of a physical structure that is analyzed and assessed, for the sake of convenience only. Embodiments of the technique are not so limited, however, and can be used to identify duplication and estimate physical dimensions of changes in or damage to other structures, such as machinery, buildings, boats, etc.

In the context of automatic damage assessment of vehicles (e.g., for an auto insurance claim process), there is an inherent requirement for a solution that determines accurate physical dimensions of damages (e.g., to accurately estimate repair/replace cost) and identifies duplicate instances from multiple images (e.g., to avoid double counting or overcompensating). A dimension may be one or more measurements of the damage such as length, a width, a height, a radius, a depth, etc. Currently, many insurance companies ask for customers to upload the vehicle images for assessing damage. The damage assessment may involve granular vehicle part detection, damage localization and classification (e.g., determining different damage types such as dent, scratch, crush, tear), etc. Furthermore, a manual consolidation of the damages captured in multiple images is performed for computing the repair or replacement cost. With the increasing pressure to reduce the turnaround time and cost (e.g., in the claim processing for insurance companies), a new automated system is needed to assess damages effectively without manual intervention. However, this surfaces many challenges that need to be handled in a reliable and automated manner.

The multiple images of vehicle(s) and damage(s) are usually captured by customers or users using mobile devices in an uncontrolled environment. Since a user may capture the multiple images while moving a handheld device around a damaged vehicle, the images suffer various artifacts of the uncontrolled environment. The artifacts may include the presence of reflections, zoom variation, angle variations, etc. Recently developed automated solutions in the industry may detect the damages on the vehicles from images but fail to identify the duplicate damage instances when the same damage is captured in different images. Further, although physical dimension estimation of the damages is essential for computing the cost to a customer, the existing methods allow each damage instance to have its own dimension estimated and predicted. Therefore, damage dimension estimates are unreliable, resulting in unreliable cost estimates.

Advantageously, the present disclosure provides a damage assessment system that localizes the damages in a vehicle accurately while removing redundancy and further computes the damage dimension by intelligently combining multiple predictions of dimensions from multiple images, thereby improving the reliability and efficiency of damage dimension estimation. In particular, the technical solution described herein identifies duplicate instances (e.g., damage instances) in a multicamera system that captures images of the same instance, at varied viewing angles and scales. The technical solution also identifies duplicate instances at a pixel level by using a combination of deep learning algorithms and computer vision geometry. The technical solution further devises a similarity index to quantify the extent of similarity between a pair of instances. The present disclosure, therefore, provides a near real-time end-to-end solution that yields accurate damage detection.

To simplify and clarify the illustration, the present disclosure customizes the technical solution to duplicate damage instance identification in vehicles (e.g., as used in auto finance and auto insurance industry), and to provide dimensions of the damages from multiple images for accurate vehicle repair cost estimates. In some embodiments, the solution may incorporate an ensemble of computer vision algorithms to calculate dimensions, generate bounding boxes, and consolidate the damage predictions to provide an overall damage estimate from multiple images captured by a vehicle owner/user.

Advantageously, the technical solution in the present disclosure may be used for real time assessment and estimation of the dimensions. The present disclosure uses multiple reference points for improving the reliability of dimension estimation. Also, the present disclosure uses multiple images to record every possible angle of the vehicles/objects, which helps remove artifacts (e.g. reflection) and thus increases the accuracy of dimension estimation. Rather than using a single estimate of dimension, the present disclosure intelligently combines the dimension estimates from multiple images to derive a reliable final estimate of dimensions. Moreover, the present disclosure incorporates a novel way of computing similarity among damage instances to properly identify duplication and avoid double-counting and consequent overcompensation.

FIG. 1 illustrates an exemplary high-level dimension estimation process 100, according to some embodiments. Advantageously, the present disclosure provides a flexible artificial intelligence (AI) and computer vision-based approach to determine an accurate dimension of the damage to an object merely from image(s) of the object. The object or physical structure may be a vehicle, a boat, machinery in an industrial plant, a building, etc., and the damage to the object may be a scratch, a dent, a hole, etc. As shown in FIG. 1, the overall dimension estimation process or pipeline 100 includes multiple stages. First, at stage 102, the images are filtered using a relevant image filter module to ensure no irrelevant image passes through the pipeline. The images may be multiple images of damaged vehicles captured by a user (e.g., a vehicle owner). Stage 102 and an image filter module 402 for performing functionalities of stage 102 will be described in detail below at least in FIGS. 4 and 5A-5C. Then, at stages 104 and 106, parts and damages are separately detected from the images. Stage 104 and an object detection module 404 used for performing functionalities of stage 104 will be described in detail below at least in FIGS. 4, 6A, and 6B. Stage 106 and a damage detection module 406 used for performing functionalities of stage 106 will be described in detail below at least in FIGS. 4, 7A, and 7B. At stage 108, process 100 further proceeds with associating the damages to the parts on which the damages are detected. At this stage, localized information (e.g., part name, damage name, damage location) about each damage for each image is obtained. Stage 108 and a consolidation module 408 used for performing functionalities of stage 108 will be described in detail below at least in FIGS. 4 and 8.

Figure 2:
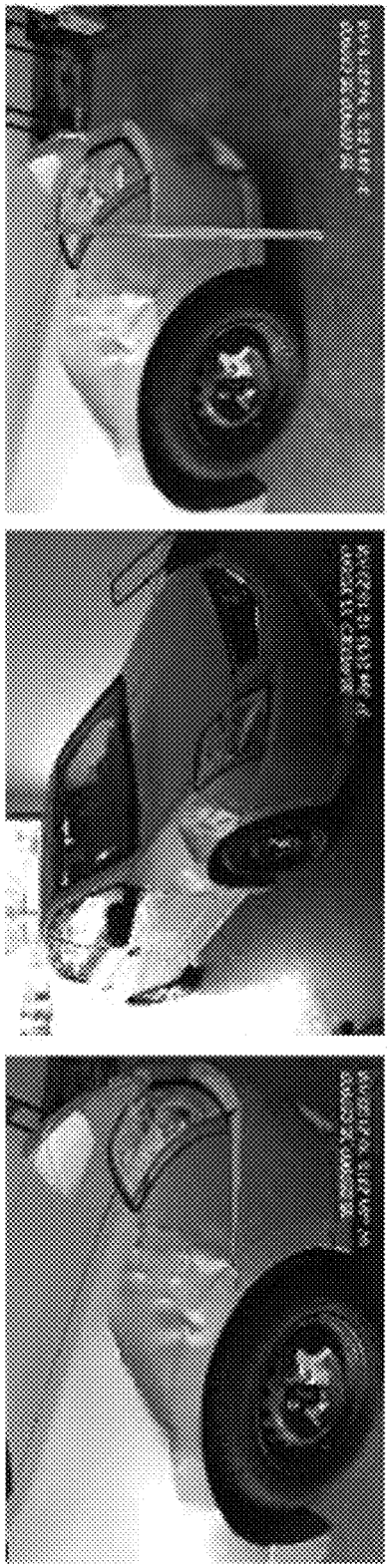
FIG. 2 shows different images of the same damage instance, according to some embodiments.
Figure 2:

Once the parts and damages are identified and associated with each other, process 100 focuses on stages 110-114 to de-duplicate damage instances and estimate physical dimensions of damages. At stage 110, damage dimensions across each image of the multiple images may be determined, which will be further described with reference to a dimension estimation module 410 in FIGS. 4, 9A, 9B, and 13. Next, at stage 112, one or more duplicity removal algorithms are used to find and remove multiple instances of the same damage. FIG. 2 shows multiple images 200 that include different instances of the same damage. For example, the above three images show the same dent 202 on the right fender of a car, and the below three images show the same dent 204 on the deck lid of the car. The duplicate damage instances 202 and 204 in FIG. 2 may be identified and removed, which will be described in detail below with reference to a de-duplication module 412 in FIGS. 4, 10A-10E, 12, and 14. At stage 114, responsive to the similarity of the duplicate instances being identified, the damage dimensions determined from multiple images of duplicated instances are merged to obtain a final damage dimension for each damage using an ensemble logic. This is described in detail below with reference to an ensemble module 414 in FIGS. 4, 11, and 12. It should be noted FIG. 1 is merely an exemplary illustration of a dimension estimation process, steps/stages may be added and/or removed within the spirit and the scope of this disclosure.

Figure 3:
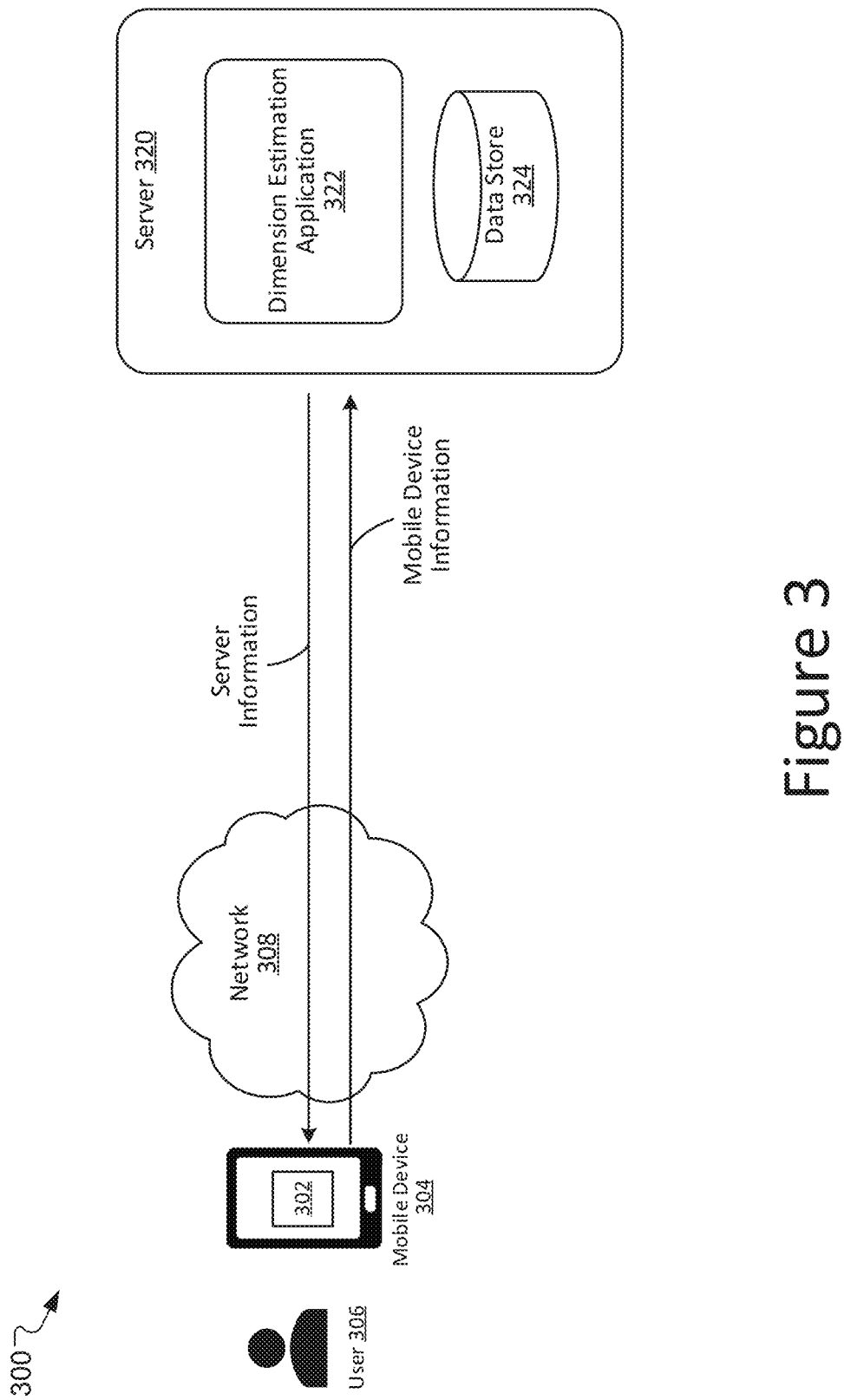
FIG. 3 is a system for estimating damage dimensions based on duplicate instance identification, according to some embodiments.

FIG. 3 is a system 300 for estimating damage dimensions based on duplicate instance identification, according to some embodiments. By way of example and not limitation, the methods described herein (e.g., process 100 in FIG. 1) may be executed, at least in part, by a software application 302 running on mobile device 304 operated by a user or customer 306. By way of example and not limitation, mobile device 304 can be a smart phone device, a tablet, a tablet personal computer (PC), or a laptop PC. In some embodiments, mobile device 304 can be any suitable electronic device connected to a network 308 via a wired or wireless connection and capable of running software applications like software application 302. In some embodiments, mobile device 304 can be a desktop PC running software application 302. In some embodiments, software application 302 can be installed on mobile device 304 or be a web-based application running on mobile device 304. By way of example and not limitation, user 306 can be a vehicle owner/user who takes pictures of a damaged vehicle using mobile device 304, a vehicle owner/user who files a first notice of loss (FNOL) for the damaged vehicle to require proper coverage for repairing and/or replacing vehicle parts, or a person who is working remotely and has access to software application 302 via mobile device 304.

Network 308 can be an intranet network, an extranet network, a public network, or combinations thereof used by software application 302 to exchange information with one or more remote or local servers, such as server 320. According to some embodiments, software application 302 can be configured to exchange information, via network 308, with additional servers that belong to system 300 or other systems similar to system 300 not shown in FIG. 3 for simplicity.

In some embodiments, server 320 is configured to store, process and analyze the information received from user 306, via software application 302, and subsequently transmit in real time processed data back to software application 302. Server 320 can include a dimension estimation application 322 and a data store 324, which each includes a number of modules and components discussed below with reference to FIG. 4. According to some embodiments, server 320 performs at least some of the operations discussed in the methods described herein (e.g., process 100 in FIG. 1). In some embodiments, server 320 can be a cloud-based server.

Figure 4:
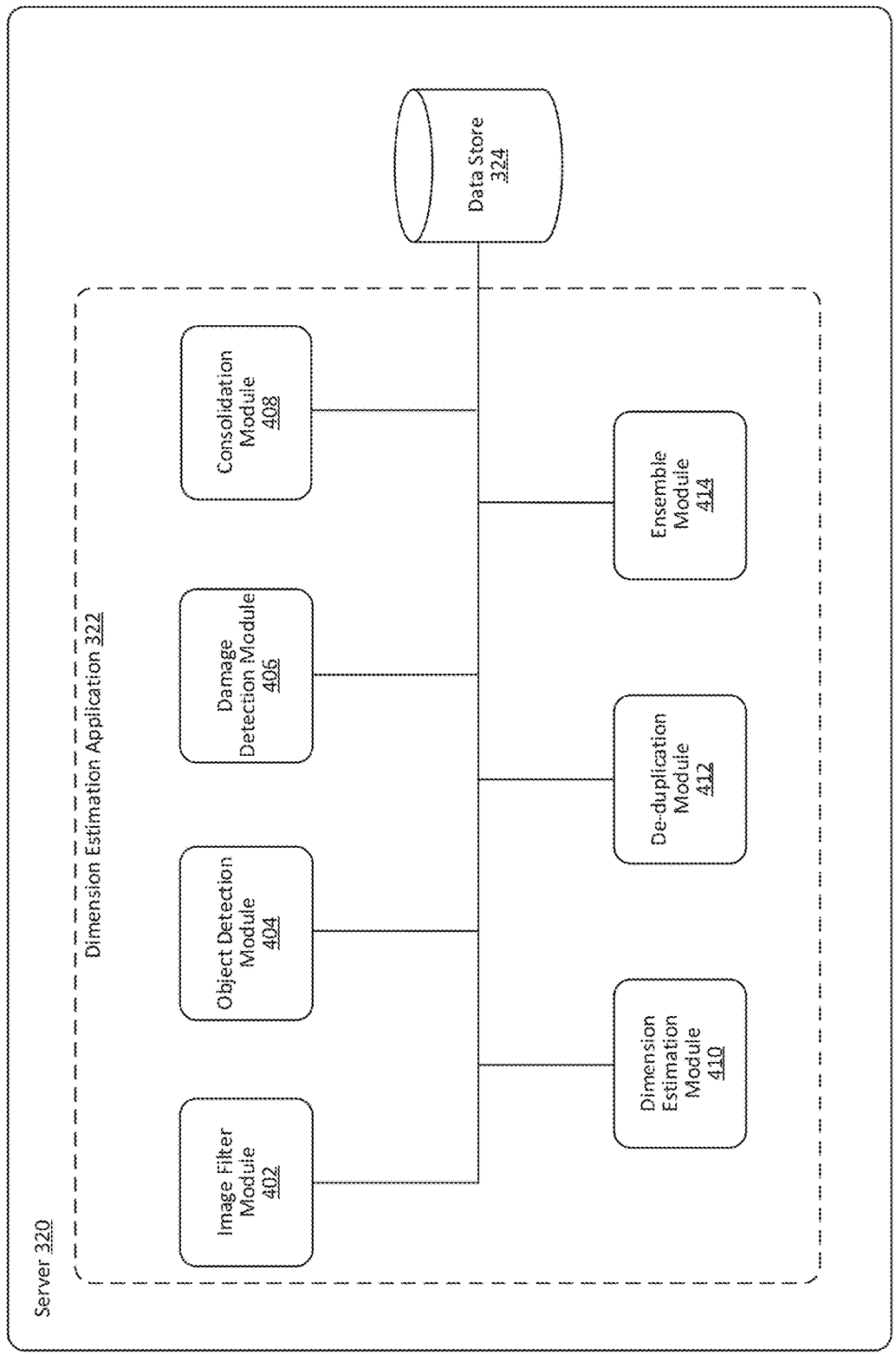
FIG. 4 is a server used as part of a system for estimating damage dimensions based on duplicate instance identification using the methods described herein, according to some embodiments.

In some embodiments, FIG. 4 depicts selective components of server 320 used to perform the functionalities described herein, for example, operations of process 100. Server 320 may include additional components not shown in FIG. 4. These additional components are omitted merely for simplicity. These additional components may include, but are not limited to, computer processing units (CPUs), graphical processing units (GPUs), memory banks, graphic adaptors, external ports and connections, peripherals, power supplies, etc., required for the operation of server 320. The aforementioned additional components, and other components, required for the operation of server 320 are within the spirit and the scope of this disclosure.

In the illustrated embodiment of FIG. 4, server 320 includes a dimension estimation application 322 and a data store 324. Dimension estimation application 322 in turn includes one or more modules responsible for processing and analyzing the information received by server 320. For example, the modules in dimension estimation application 322 may have access to the images of physical structures/ objects (e.g., vehicles) and damages on the structures received from user 306 via software application 302 residing on mobile device 304.

In some embodiments, dimension estimation application 322 of server 320 includes an image filter module 402, an object detection module 404, a damage detection module 406, a consolidation module 408, a dimension estimation module 410, a de-duplication module 412, and an ensemble module 414. In some embodiments, dimension estimation application 322 of server 320 may include only a subset of the aforementioned modules or include at least one of the aforementioned modules. Additional modules may be present on other servers communicatively coupled to server 320.

For example, dimension estimation module 410 and de-duplication module 412 may be deployed on separate servers (including server 320) that are communicatively coupled to each other. All possible permutations and combinations, including the ones described above, are within the spirit and the scope of this disclosure.

In some embodiments, each module may store the data used and generated in performing the functionalities described herein in data store 324. Data store 324 may be categorized in different libraries (not shown). Each library stores one or more types of data used in implementing the methods described herein. By way of example and not limitation, each library can be a hard disk drive (HDD), a solid-state drive (SSD), a memory bank, or another suitable storage medium to which other components of server 320 have read and write access.

Relevance Filter

Figure 5A:
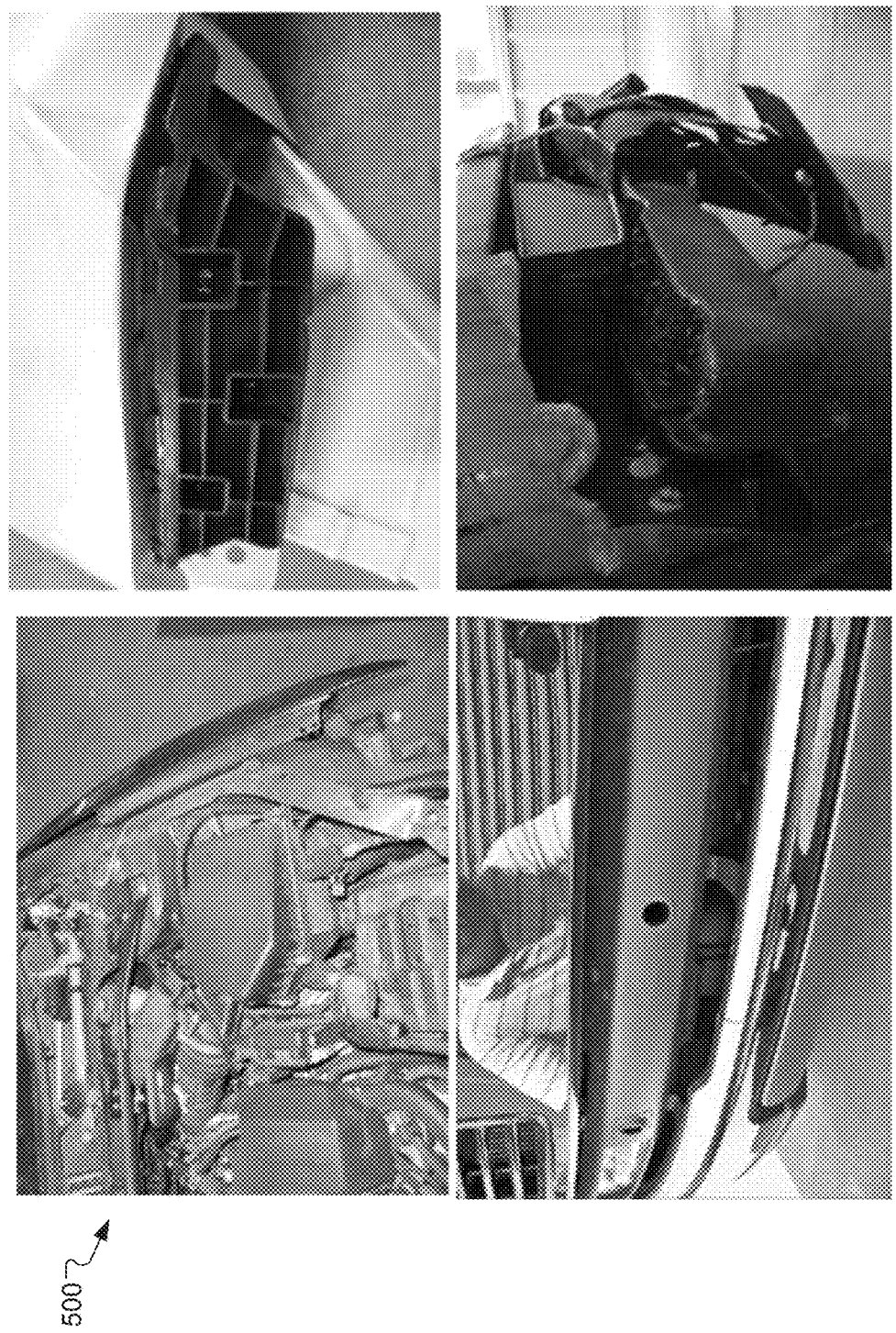
FIG. 5A shows example irrelevant images without a view of a vehicle, according to some embodiments.
Figure 5B:
FIG. 5B shows example zoomed-in images without part context of a vehicle, according to some embodiments.

Image filter module 402 receives multiple images related to structure/object damage estimation and filters out an irrelevant image(s) from the received images, which corresponds to the relevance image filter procedure in stage 102 of FIG. 1. In some embodiments, image filter module 402 may receive the images from a vehicle owner or user (e.g., user 306). The user may take photos of a vehicle and damage(s) on the vehicle using mobile device 304, where the use and/or movement of mobile device 304 may cause the presence of arbitrary artifacts such as reflections, zoom variation, angle variations, etc., and thus form an uncontrolled environment. In other embodiments, image filter module 402 may receive the images from a camera in a controlled environment (e.g., a surveillance camera at a fixed location). In some embodiments, the irrelevant images may be images without any view of the vehicle (i.e., non-vehicle images) or images that are too zoomed-in to have any vehicle parts recognized from the image context (i.e., zoomed-in images). The irrelevant images may cause subsequent operations such as part and damage detection performed by corresponding downstream modules inaccurate and inefficient, and, therefore, image filter module 402 removes these images at the initial stage of the entire dimension estimation process (i.e., at the first stage 102 in FIG. 1). Example non-vehicle images 500 are shown in FIG. 5A and example zoomed-in images 520 are shown in FIG. 5B.

In some embodiments, image filter module 402 may use various images of vehicles and other images to train one or more AI/ML models/systems to filter out non-vehicle images and zoomed-in images. The one or more models may include an artificial neural network (ANN) or, more specifically, a convolutional neural network (CNN) such as ResNet™, a regional CNN (R-CNN), a masked R-CNN, a deep neural network such as Deeplab™, a deep local feature (DELF) image registration model, etc. In some embodiments, image filter module 402 may also train the AI/ML models based on images of the exterior and interior of vehicles to filter out images of the interior of the vehicle. Usually, only the exterior of vehicles may be used to isolate the damage and estimate damage dimensions.

Figure 5C:
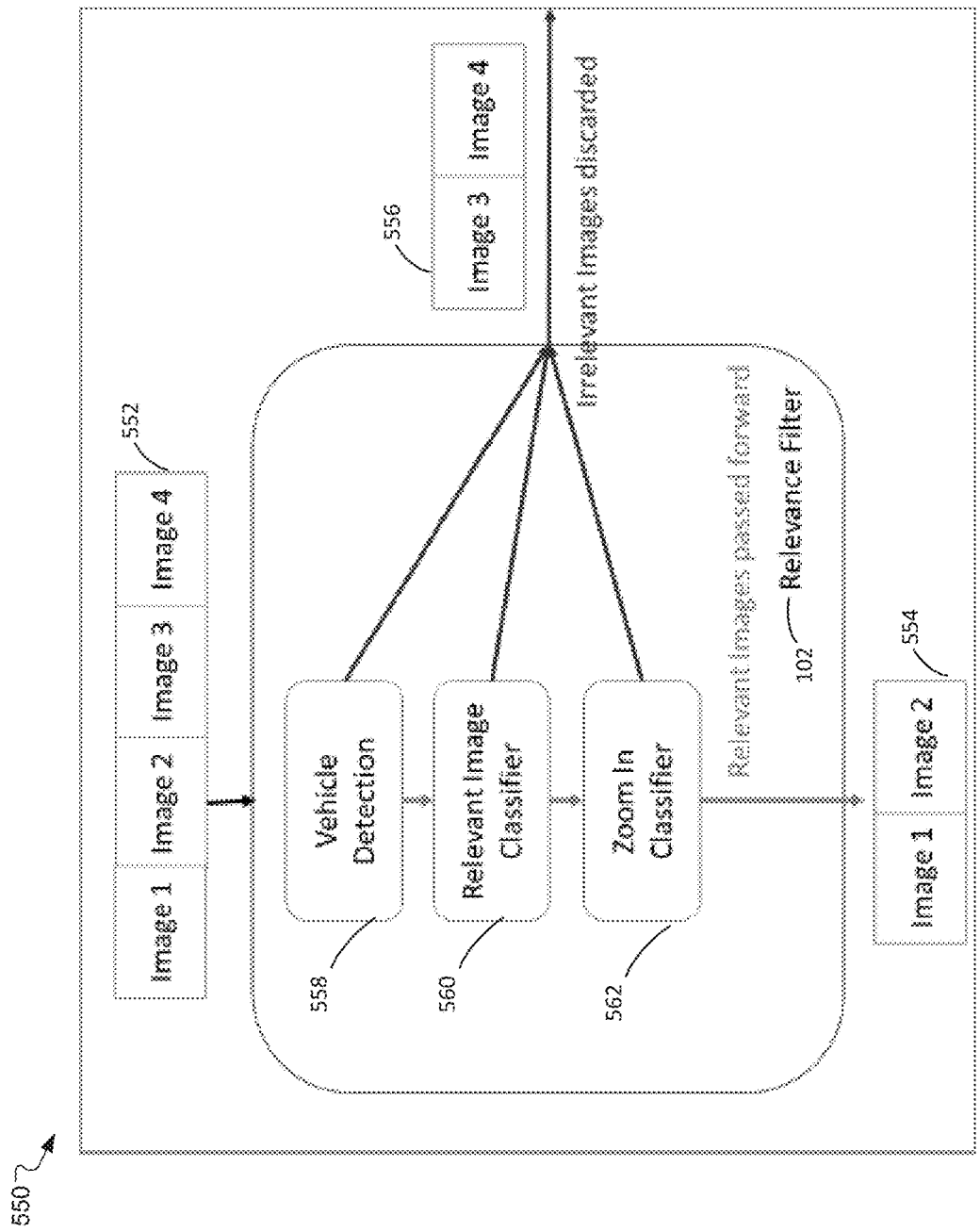
FIG. 5C illustrates an exemplary relevance filter procedure as shown in FIG. 1, according to some embodiments.

When acting as a filter to short-list images with potential vehicle damages, image filter module 402 may contain a series of ensemble models developed for image classification and image segmentation. FIG. 5C illustrates an exemplary relevance filter procedure 550 in stage 102 of FIG. 1, according to some embodiments. This procedure may be implemented by image filter module 402 in communication with other components of system 300. As depicted in the example of FIG. 5C, image filter module 402 receives image 1 through image 4 in 552, processes the four images, and outputs relevant images 1 and image 2 in 554 for further processing while discarding irrelevant images 3 and 4 in 556. Further, as depicted in FIG. 5C, image filter module 402 may perform vehicle detection in 558, classify the received images using relevant image classifier in 560, and classify the received images using zoom-in classifier in 562, to filter out irrelevant images.

In some embodiments, for vehicle detection in 558, image filter module 402 may include a first model or an image segmentation model to filter out images where no vehicle is detected. For example, image filter module 402 may use a DeeplabV3+ model to segment out vehicle pixels. Image filter module 402 may use a second classification model or a deep learning model to classify the images using a relevant image classifier in 560. The second model or deep learning model is trained to classify any images that do not appear to include a vehicle, e.g. images of vehicle documents, vehicle VIN numbers, etc. The second classification model complements the first model by ensuring no relevant images will be mistakenly removed. For example, the second model may properly classify a relevant image even if the first model does not detect a vehicle on the image because of bad lighting conditions or unusual angle of capture. In some embodiments, the second model may be based on an Xception model that is pre-trained on particular data set (e.g., Imagenet dataset) and is then finetuned on 50000 hand-labeled images. Next, when classifying the images using a zoom-in classifier in 562, image filter module 402 may apply a third model to segregate images that are too zoomed-in to have any context be recognized. Such zoomed-in images may provide information about damage, but the damage may not be associated with any vehicle parts due to the unrecognizable context of the images. The association of parts and damages will be described below in FIG. 8. In some embodiments, image filter module 402 may use a ResNet50 model to train a zoomed-in versus zoomed-out image classifier. For example, the model may be trained with approximately 1500 images and rigorous hyperparameter tuning. Image filter module 402, therefore, trains different AI/ML models to output and forward relevant images to subsequent models/stages for further processing. While the relevance filter procedure is described in the context of vehicle damage detection, it should be noted that similar procedures may be created for other physical structures such as boats, buildings, etc., to transmit only relevant images to downstream or subsequent models/modules.

Part Detection

Figure 6A:
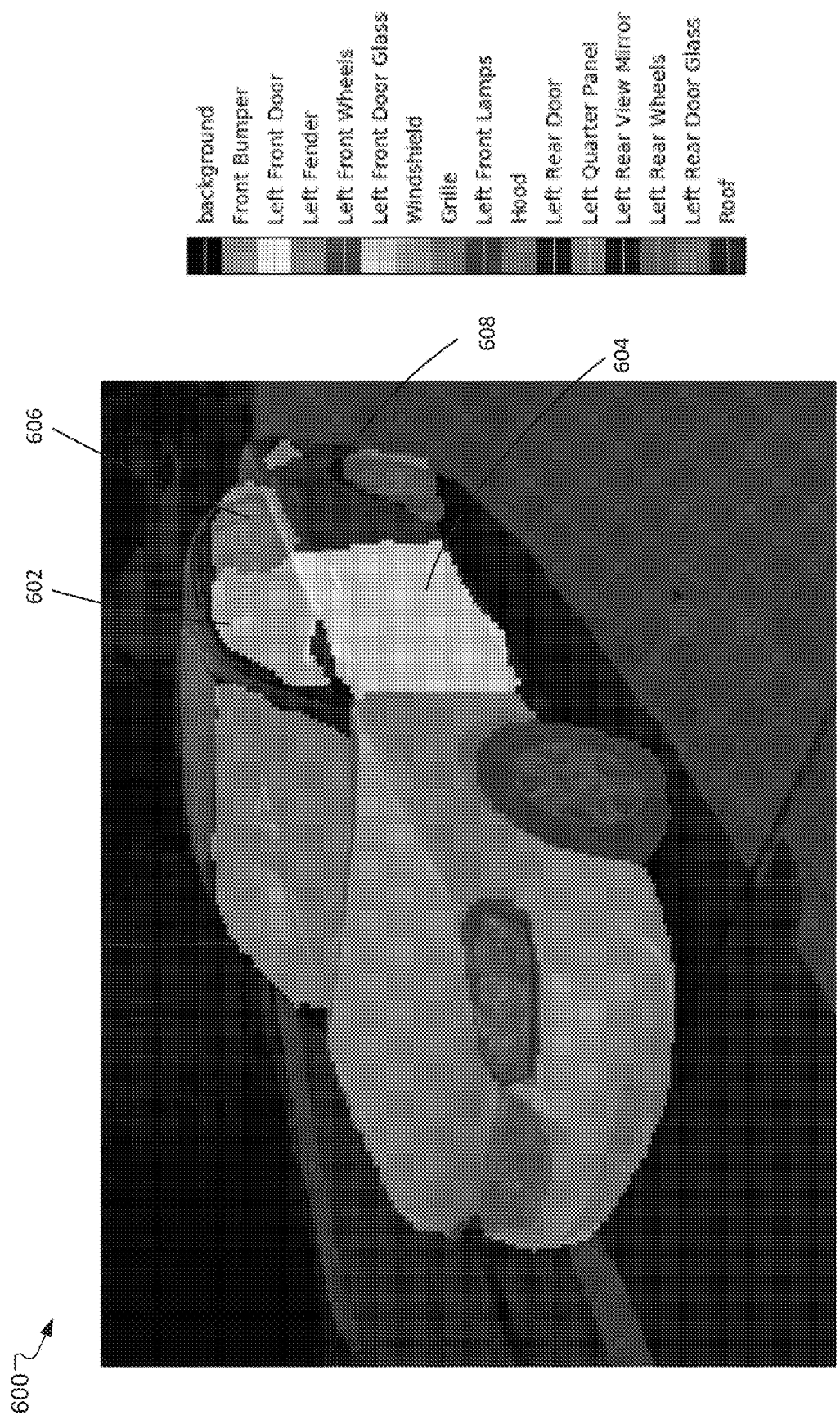
FIG. 6A shows a part segmentation result, according to some embodiments.

Referring back to FIG. 4, object detection module 404 identifies different parts of an object/structure (e.g., a vehicle) in one or more images of the object (e.g., the exterior of the vehicle). This corresponds to the part detection/segmentation procedure in stage 104 of FIG. 1. The detected different parts may include back glass, fender left, fender right, front bumper, front door left, front door right, front lamps left, front lamps right, grille, hood, quarter panel left, quarter panel right, rear bumper, rear door left, rear door right, rear lamps left, rear lamps right, roof, trunk lid, wheels front left, wheels front right, wheels rear left, wheels rear right, and windshield. In some embodiments, object detection module 404 generates a part segmentation map including different regions (e.g., bounding boxes) of identified parts in an image. FIG. 6A shows a part segmentation map 600 resulted from the part segmentation performed by object detection module 404. Each region in different colors is an image segmentation or part segmentation representing a detected/segmented different vehicle part. For example, each segmentation 602, 604, 606, and 608 respectively represents the left front door class, the left front door, the left rear door class, the left rear door.

The detected different vehicle parts together with the detected damage (described below) may help make a repair or replace decision about a vehicle. For example, auto finance and auto insurance companies may calculate the repair/replace cost based on the number, area and severity of damages on each vehicle part. Also, the part segmentation is of particular importance because the subsequent duplicate damage instance identification may rely on the accurate determination of particular vehicle parts and front-back identifiers from the part segmentation.

Figure 6B:
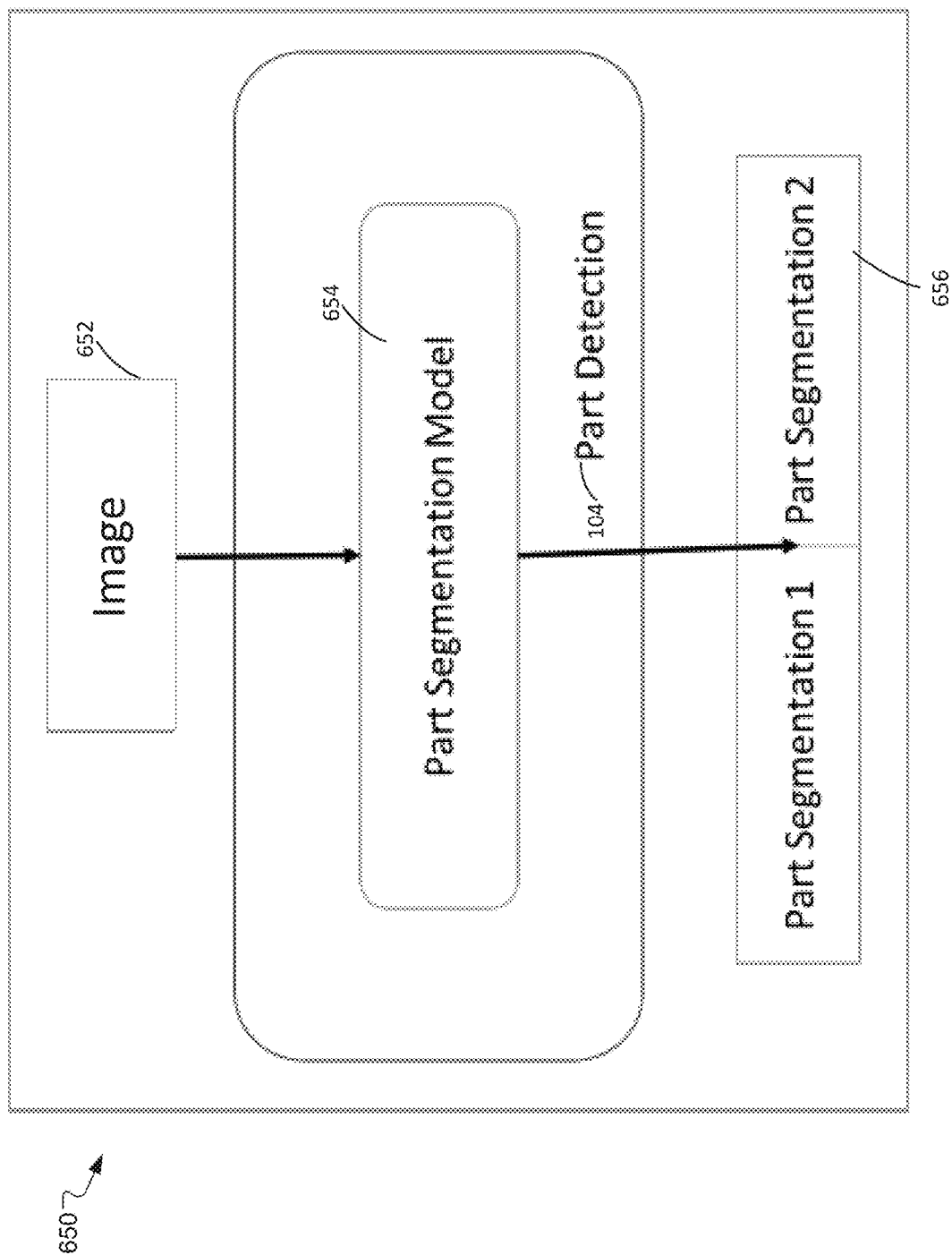
FIG. 6B illustrates an exemplary part detection procedure as shown in FIG. 1, according to some embodiments.

In some embodiments, object detection module 404 trains one or more part segmentation models/systems to segment vehicle parts. FIG. 6B illustrates an exemplary part detection procedure 650 in stage 104 of FIG. 1, according to some embodiments. As depicted, an image 652 is inputted to a part segmentation model 654 for part detection, and as a result, part segmentation 1 and part segmentation 2 are outputted in 656. In some embodiments, object detection module 404 may train the part segmentation model 654 using DeepLabv3+ architecture with TensorFlow Xception backbone. For example, the dataset used for this task may be the open source PASCAL Parts dataset along with a particular hand-labeled dataset.

Damage Detection

Figure 7A:
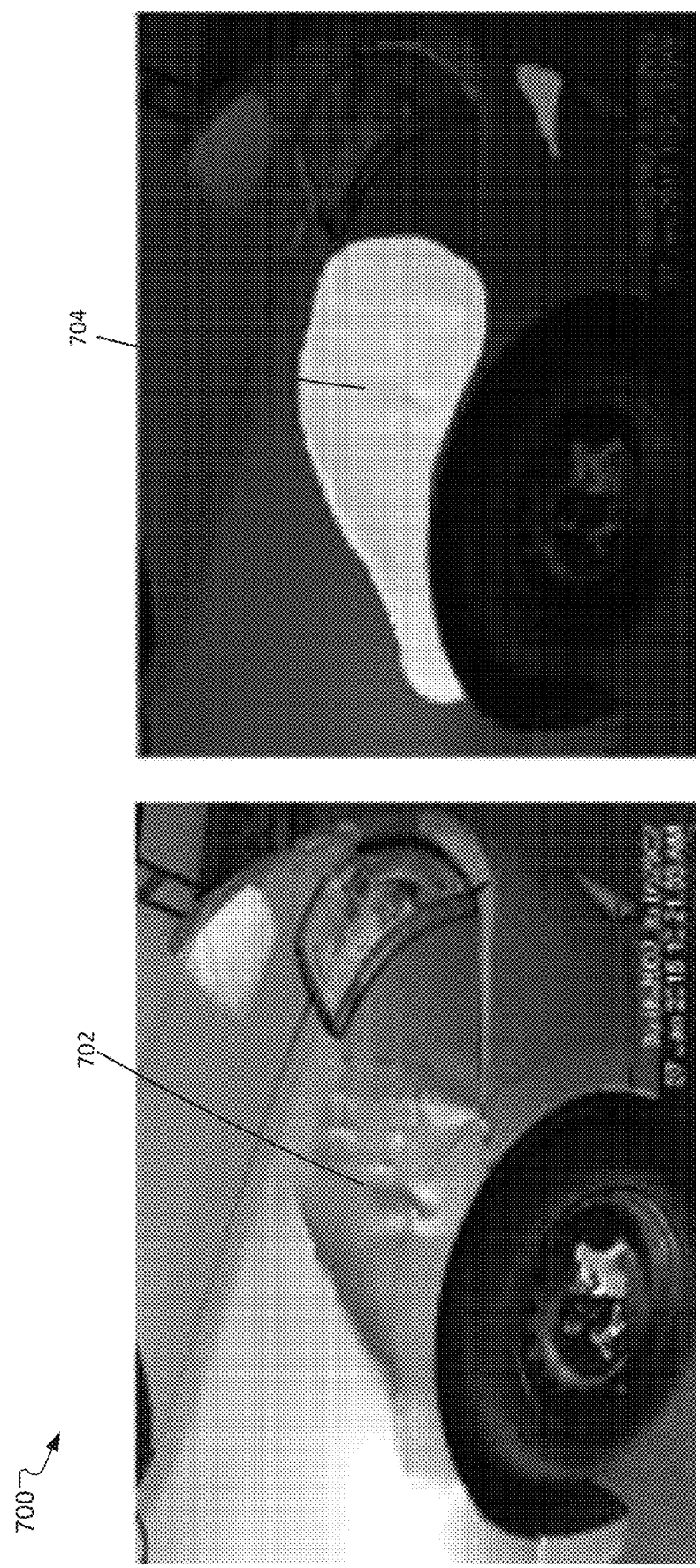
FIG. 7A shows a damage segmentation result, according to some embodiments.

Damage detection module 406 identifies and distinguishes between different kinds of object damages (e.g., damages of a vehicle) in one or more images of the objects. This corresponds to the damage detection procedure in stage 106 of FIG. 1. In some embodiments, damage detection module 406 may identify six different types of damages including dents, scratches, misalignments, missing parts, crush, and tear. In other embodiments, the classification between fewer or more damage types may be performed. FIG. 7A shows a damage segmentation map 700. The damage segmentation map is an output from the damage segmentation performed by damage detection module 406, which includes one or more regions (e.g., bounding boxes) that each represents an image segmentation (i.e., damage segmentation) representing a damage. In FIG. 7A, a damage segmentation 704 corresponding to the actual damage 702 is identified. Damage segmentation may improve the accuracy of the repair estimates.

Figure 7B:
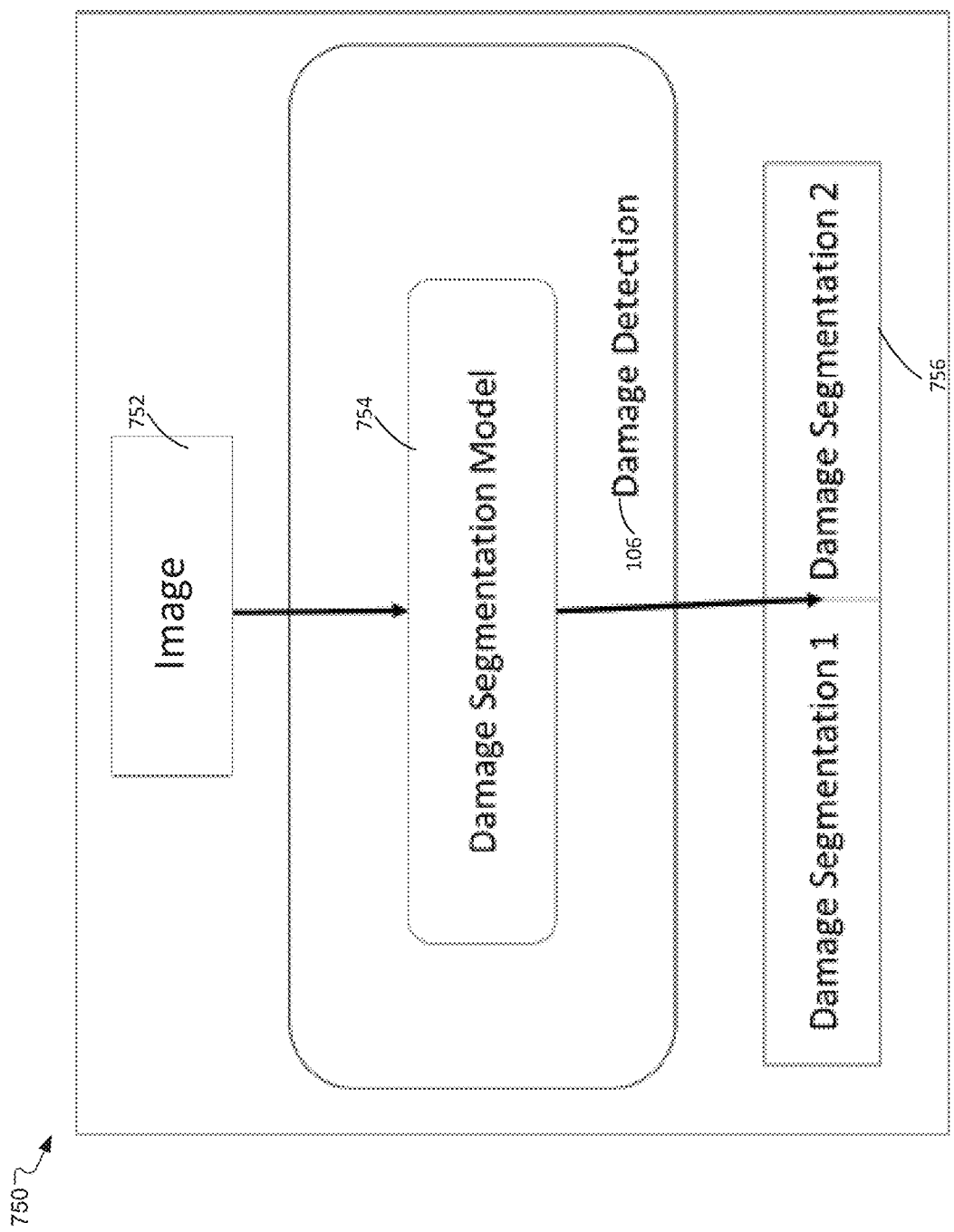
FIG. 7B illustrates an exemplary part detection procedure as shown in FIG. 1, according to some embodiments.

In some embodiments, damage detection module 406 uses one or more damage segmentation models/systems to help localize and classify the damages across the vehicle body. FIG. 7B illustrates an exemplary part detection procedure 750 in stage 106 of FIG. 1, according to some embodiments. As depicted, an image 752 is inputted to a damage segmentation model 754 for damage identification, and as a result, damage segmentation 1 and damage segmentation 2 are outputted in 756. In some embodiments, damage detection module 406 may train a DeepLabv3+ architecture with Xception-65 backbone on Tensorflow for damage segmentation.

Damage-to-Part Association

Figure 8:
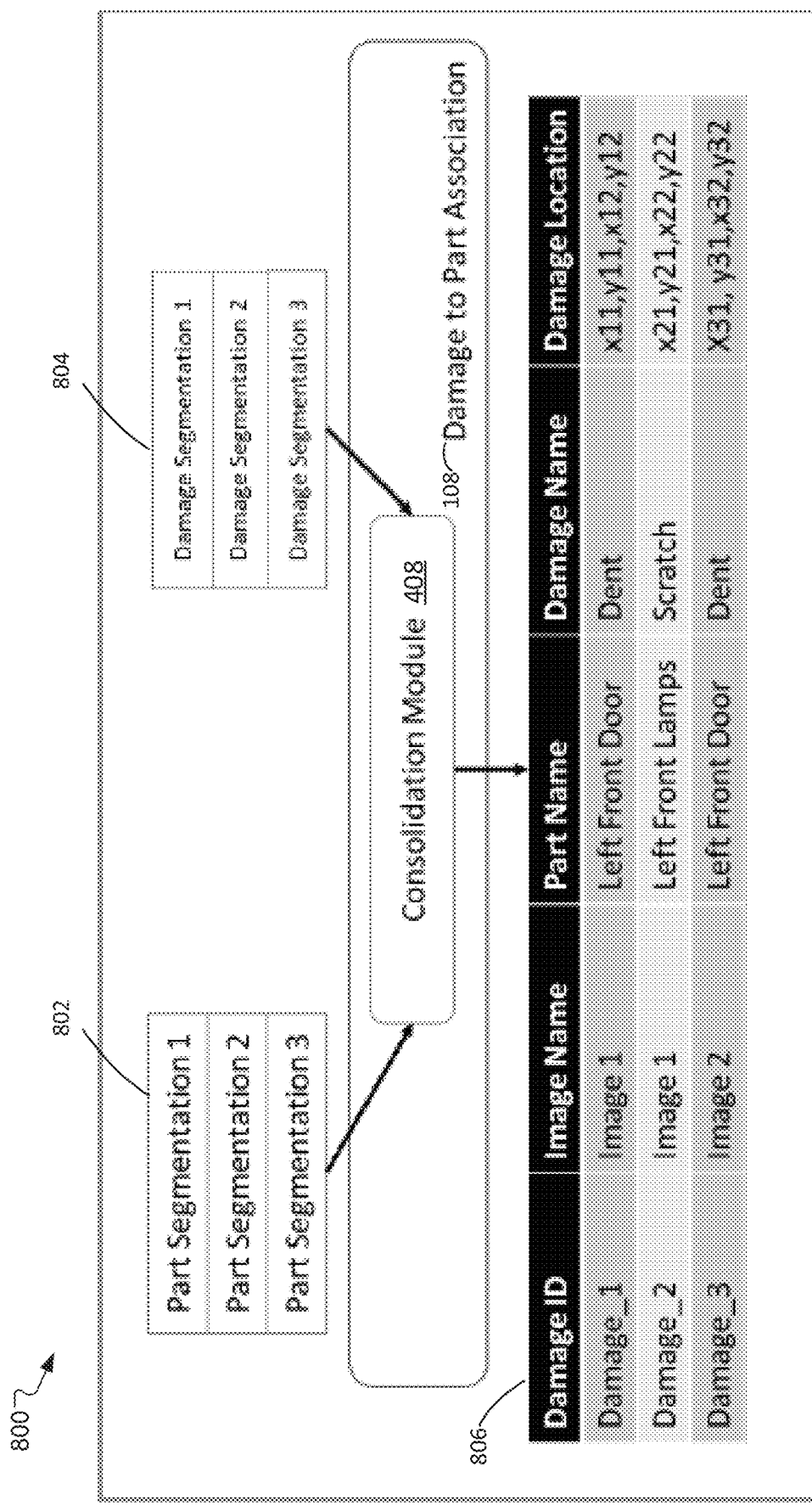
FIG. 8 illustrates an exemplary damage-to-part association procedure as shown in FIG. 1, according to some embodiments.

Consolidation module 408 trains one or more AI/ML models to associate damage segments of an object (e.g., a vehicle) with one or more parts (e.g. external parts) of the object. This corresponds to damage-to-part association procedure in stage 108 of FIG. 1. The same or another AI/ML model(s)/system(s) compared to the models used in recognizing parts and damages may be trained by consolidation module 408. In some embodiments, consolidation module 408 may perform the intersection of the damage segmentation maps (e.g., as shown in FIG. 7A) to the part segmentation maps (e.g., as shown in FIG. 6A) and output the consolidation result (e.g., the association between the parts and damages) based on the intersection. FIG. 8 illustrates an exemplary damage-to-part association procedure 800 in stage 108 of FIG. 1, according to some embodiments. As depicted, responsive to receiving part segmentations 802 and damage segmentations 804, consolidation module 408 determines if an image includes both an identifiable external part/part segmentation and an associated damage segmentation, and generates a consolidation result in table 806. For example, image 2 may include a dent "damage 3" at location "x31, y31, x32, y32" and this dent is on the left front door of a car, while image 1 may include two types of damages each associated with different parts at different locations as shown in the first two rows of table 806.

In some embodiments, the resulted images obtained from consolidation module 408 may contain duplication, which are referred to as candidate duplicate damage instances, are forwarded to de-duplication module 410 for checking and identifying the duplication as described below. In some embodiments, the candidate duplicate damage instances may include the damage segmentations and association information with the corresponding part segmentations. Through associating the damages to the corresponding parts, consolidation module 408 may reduce the number of images of the candidate duplicate damage instances that need to be processed/de-duplicated for each damage type, and consequently reduce the chances of incorrect duplicate instance identification.

Damage Dimension Estimation

Dimension estimation module 410 determines/estimates the actual dimension of a structure/object damage (e.g., the damage of a vehicle) along with a confidence score of the estimation from each image that shows the presence of damage on an associated vehicle part. This corresponds to the damage dimension estimation procedure in stage 110 of FIG. 1. An accurate real-world dimension of the damage may facilitate the estimation of the severity of the damage and the cost of repairing/replacing the damage.

Figure 9A:
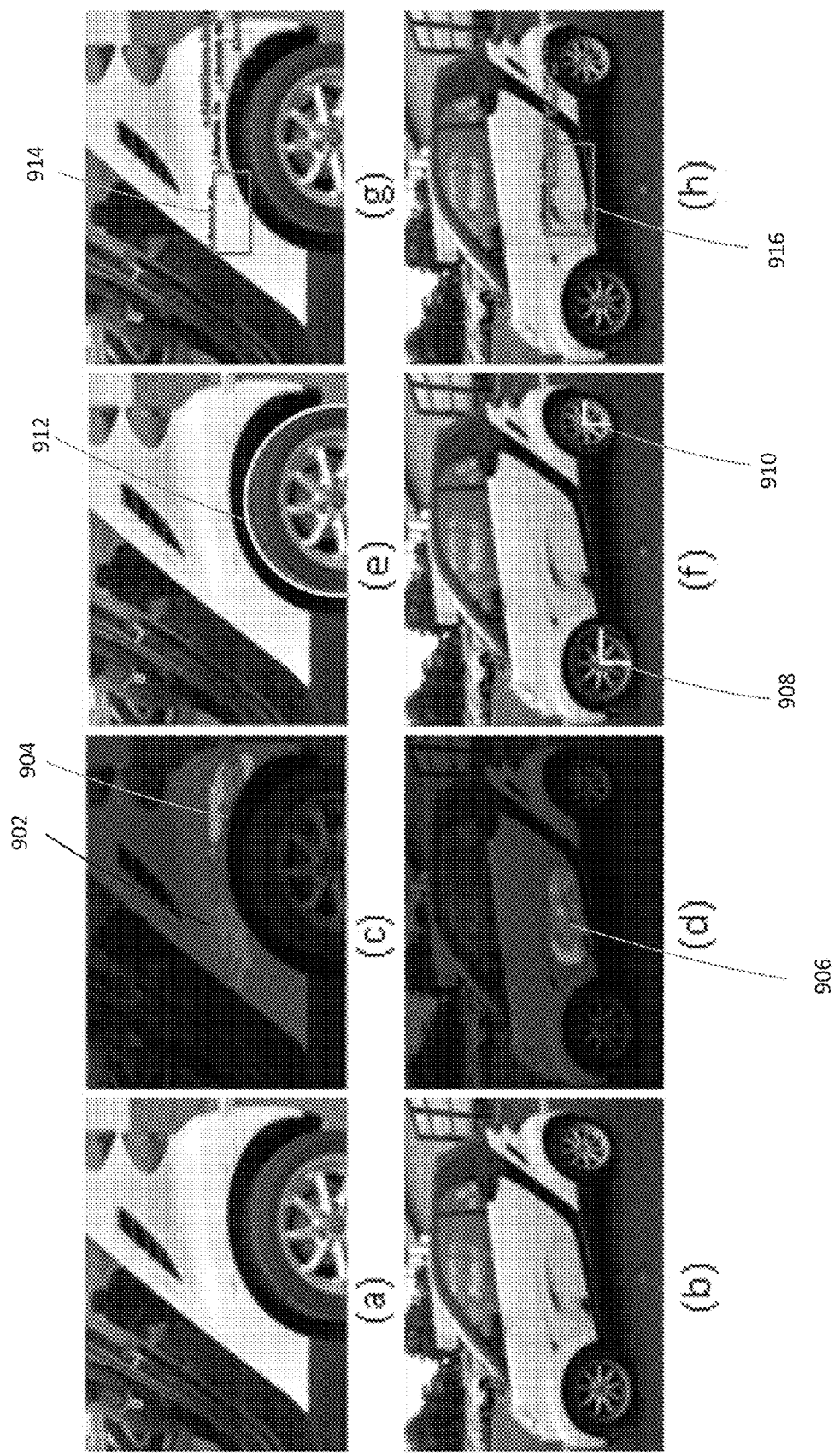
FIG. 9A illustrates a process of determining damage dimensions using images of objects from different viewpoints, according to some embodiments.

In some embodiments, dimension estimation module 410 estimates the damage dimension and confidence/confidence score based on a view of the visible object, e.g., as shown in FIG. 9A. Two images of the same vehicle which focus on a scratch and a dent in different parts of a car body are shown in (a) and (b) of FIG. 9A. Damage detection module 406 may perform damage segmentation on images (a) and (b), and generate the damage segmentation outputs in (c) and (d). As depicted, 902 and 904 in (c) capture the damage segmentation outputs corresponding to the scratch on image (a), and 906 in (d) captures the damage segmentation output corresponding to the dent on image (b). Dimension estimation module 410 is capable of estimating the physical dimension of an object from a single image of the object. For example, dimension estimation module 410 may determine the dimension of the scratch from the single image (a) using the damage segmentations 902 and 904 in (c), and determine the dimension of the dent from the single image (b) using the damage segmentation 906 in (d). A main challenge in such object/damage dimension estimation is to identify a reference object with known dimensions from each image.

A reference object may be used to determine a scale, i.e., the pixel to inch ratio of an object. The scale may then be used to determine the physical dimension of the damage. However, this simple scale-based damage estimation is only applicable under the assumption that both the object and the damage are in the same plane and the plane is orthogonal to the camera used to capture the image. The assumption may fail when the damages are present in the corner (i.e., a point of intersection of two planes) of the object or when the handheld camera is arbitrarily moved by a user. To address this issue, in some embodiments, dimension estimation module 410 identifies one or more reference objects and estimates the dimensions of the damages based on the reference objects in two different ways.

Dimension estimation module 410 may identify a vehicle part or using a wheel as a reference object. In some embodiments, if dimensions of each part of a vehicle are already known (e.g., from a pre-filled database), a baseline algorithm is that dimension estimation module 410 takes a vehicle part as the reference object. This is applicable to the images of the vehicle where the object and the damage are on the same plane. In such cases, dimension estimation module 410 leverages the known part dimension information (e.g., the physical dimension of a visible part) and the pixel dimensions (e.g., the corresponding pixel measurement of the visible part in the image) to calculate a scale. Dimension estimation module 410 then uses the scale to calculate the physical dimension of the damage.

In other embodiments, dimension estimation module 410 may use a well-defined part (e.g., wheel) as a reference object. A wheel has a particular distinct pattern irrespective of the vehicle type, and part detection module 406 can detect the wheel with high accuracy. Thus, dimension estimation module 410 often chooses a wheel as a reference object. Other similar parts that have distinctive patterns may also be chosen as the reference object. Based on the physical dimension of the wheel (e.g., retrieved from a database using vehicle model information), dimension estimation module 410 may determine the pixel dimension of the wheel from the received image(s) and estimate a scale based on the physical and pixel dimensions of the wheel. However, the accuracy of the scale estimate may be challenged by many factors of the analyzed image(s), for example, multiple wheel visibility at different locations, partial wheel visibility, tilted wheel, etc.

To accurately calculate a scale, in some embodiments, dimension estimation module 410 detects wheel pose and visibility. Dimension estimation module 410 may receive the part segmentation outputs, e.g., the segmentation maps containing a wheel part, from object detection module 406, and use shape descriptors to detect whether the wheel is partially or fully visible. In some embodiments, dimension estimation module 410 may train a support vector machine (SVM) model on the shape descriptors of the wheel segmentation maps to classify the segmentations into different categories. The categories may include, but are not limited to, frontal pose-full visibility, frontal pose-partial visibility, tilted pose-full visibility, tilted pose-partial visibility, etc.

In some embodiments, dimension estimation module 410 may determine the pixel dimension of the wheel depending on the pose and the visibility of the wheel, and then estimate the scale based on the known physical dimension of the wheel and the determined pixel dimension of the wheel. Below lists the determination of the pixel dimension of the wheel when the wheel is categorized into different categories:

1. Frontal pose-full visibility: Dimension estimation module 410 may directly use the wheel segmentation map received from object detection module 406 to calculate the wheel dimensions in pixels. As shown in FIG. 9A, the pixel wheel dimensions 908 and 910 may be directly determined from image (f).

2. Frontal pose-partial visibility: Dimension estimation module 410 may reconstruct the wheel using Hough Circles and get the corresponding radius of the wheel in pixels as shown in 912 of image (e) in FIG. 9A. After the actual dimension of the wheel is determined, the pixel to inch ratio may be calculated as a scale or scale factor.

3. Tilted pose-full visibility: This occurs when the vehicle image is taken from non-frontal angles. In such a case, dimension estimation module 410 may apply perspective correction on the wheel segmentation map received from object detection module 406 to transform the wheel to a frontal pose and then determine the accurate pixel dimensions of the wheel.

4. Tilted pose-partial visibility: Dimension estimation module 410 may first use perspective correction on the wheel segmentation map and then reconstruct the wheel using Hough Circles to obtain the scale factor.

Additionally, dimension estimation module 410 may face an issue of multiple wheels visibility. For a four-wheeler passenger vehicle, it can be safely assumed that at most two wheels are visible from any view angle of the vehicle. However, the two visible or detected wheels may have different scales if the plane of the wheels is not orthogonal to the point of view. Therefore, if the damage is present in the plane as that of the wheels, the scale of the damage would be a value in between the scales of the two wheels. To overcome this issue, in some embodiments, dimension estimation module 410 may incorporate the perspective correction (as mentioned above) with a weighted average. The scale factor of the damage is the weighted average of the scales of the two detected wheels, where the weight is inversely proportional to a distance of the damage to that wheel.

Figure 9B:
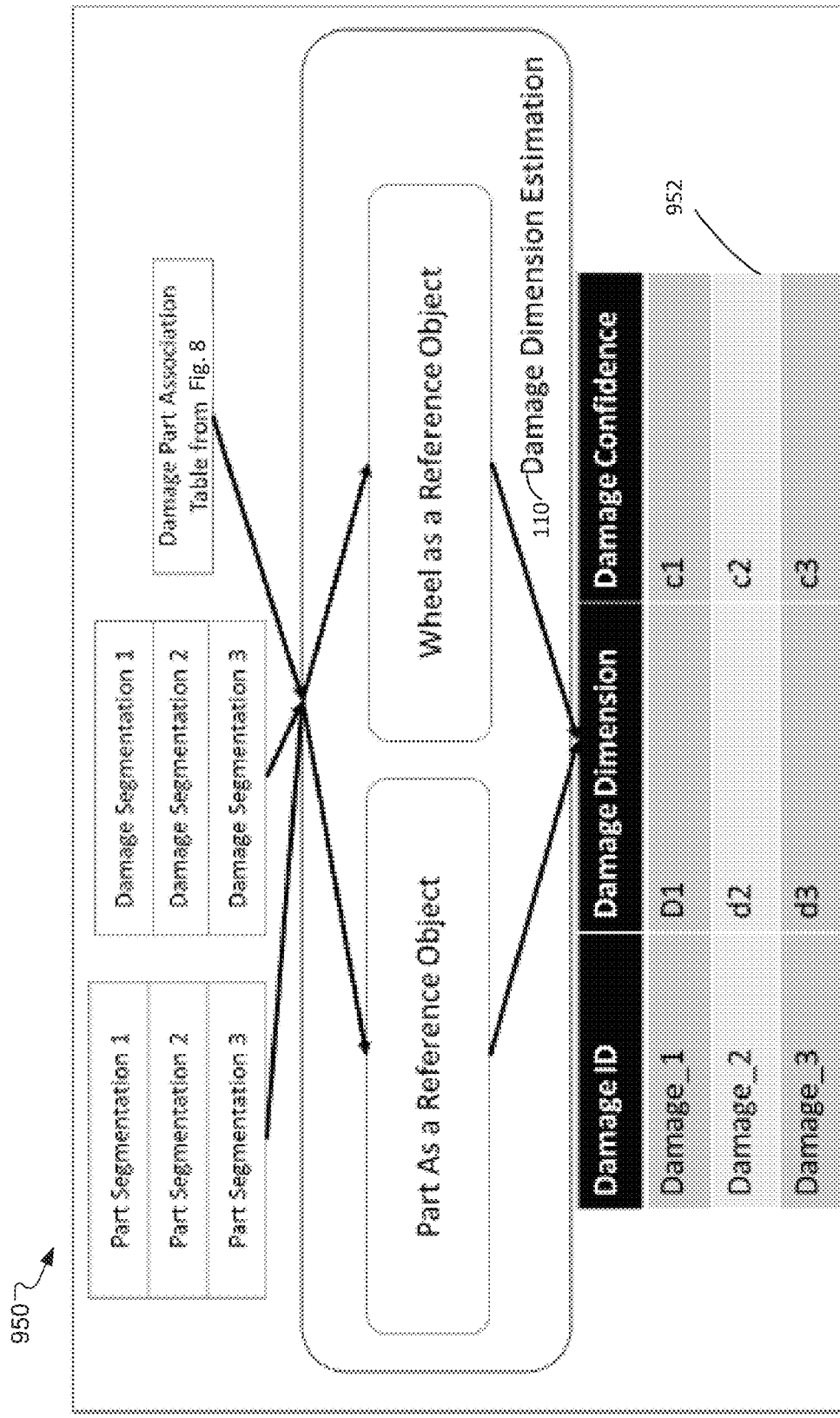
FIG. 9B illustrates an exemplary dimension detection procedure as shown in FIG. 1, according to some embodiments.

Based on the scale and the pixel dimensions of the damage, dimension estimation module 410 may calculate the actual dimension of the damage and confidence for each damage in each image. For example, as shown in FIG. 9A, dimension estimation module 410 may obtain the scale factors by the reconstruction of partially visible wheel and multi wheel visibility, respectively in images (e) and (f). Based on the scale factors, dimension estimation module 410 may compute damage dimensions 914 and 916 of the detected damages in images (g) and (h). Further, FIG. 9B illustrates an exemplary dimension detection procedure 950 in stage 110 of FIG. 1, according to some embodiments. As depicted, part segmentations obtained from object detection module 404 (e.g., 656 in FIG. 6B), damage segmentations obtained from damage detection module 406 (e.g., 756 in FIG. 7B), as well as the association information obtained from consolidation module 408 (e.g., 806 in FIG. 8) are inputted to damage estimation module 410. As a response, damage estimation module 410 identifies a specific vehicle part or uses a wheel as a reference object. In either way, damage estimation module 410 uses the reference object to determine a scale factor. Damage estimation module 410 then uses the scale to calculate the actual dimensions of the damages (e.g., d1, d2, d3) along with confidence scores (e.g., c1, c2, c3) shown in table 952.

Damage De-Duplication

Referring back to FIG. 4, de-duplication module 412 identifies duplicated damage instance(s) from candidate duplicate damage instances received from consolidation module 408. This corresponds to the damage de-duplication procedure in stage 112 of FIG. 1. The identification of the actual duplicate damage instances in this stage is robust because only a reduced number of images including the candidate duplicate instances are passed from consolidation module 408 to de-duplication module 412 for processing.

In some embodiments, de-duplication module 412 may determine the relative location of a damage instance with respect to the location of one or more anchor parts. An anchor part is a key part visible on the image (e.g., one of the parts shown in FIG. 6A). De-duplication module 412 may tag each identified damage instance to an anchor part or a set of anchor parts depending on how they are positioned relatively. However, such tagging is very difficult in an unconstrained environment since various factors such as the angle of image capture, occlusions in the image, variations in lighting conditions, reflections, etc. are uncontrolled. De-duplication module 412 applies a corresponding algorithm for duplicate instance detection in different situations.

Figure 10A:
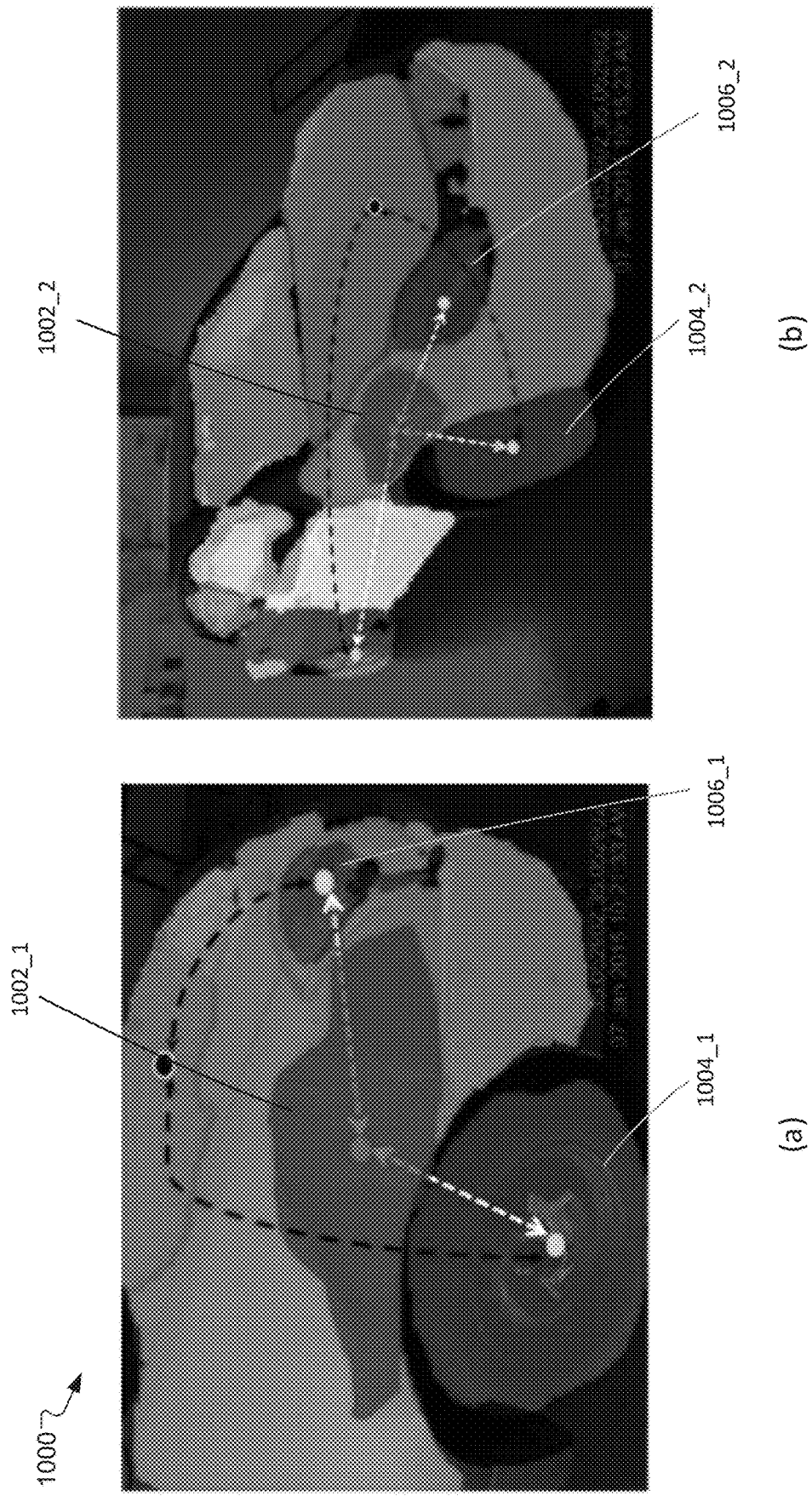
FIG. 10A shows relative locations between damage and anchor parts in duplicate damage instance identification, according to some embodiments.
Figure 10B:
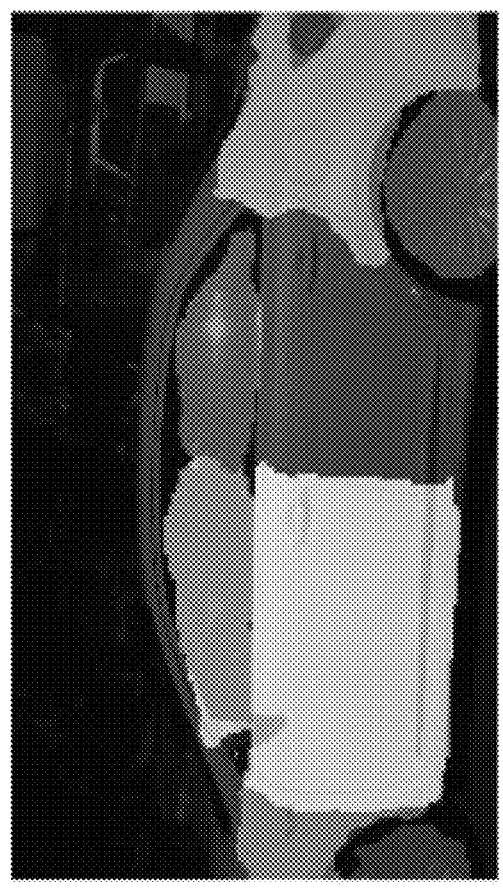
FIG. 10B shows a scenario of rectifying left-right confusion based on relative positions of front and back wheels in duplicate damage instance identification, according to some embodiments.
Figure 10B:

In some embodiments, a front or back identifier is detected, and one or more anchor parts are visible in an image. De-duplication module 412 uses the front or back identifiers to determine whether it is a front view or a back view of a vehicle in the image. De-duplication module 412 may identify the centroids of the anchor parts falling to the right of the back identifier to be the right anchor parts such as right rear wheel, right headlight, etc. The tagging is reversed if it is determined to be a front view due to the presence of a front identifier. FIG. 10A shows scenario 1000 where a front view of a vehicle is determined. In images (a) and (b), the relative location of the identified dent(s) 1002_1/1002_2 with respect to the anchor parts are shown. The identified anchor parts are the right front wheel(s) 1004_1/1004_2 and the right headlight(s) 1006_1/1006_2 in this scenario. The two images may include duplicated damage instances of the same damage/dent, as described below.

In other embodiments, neither a front identifier nor a back identifier is detected or visible in an image, but one or more anchor parts are visible in the image. Such a scenario usually indicates a side view or a highly zoomed-in view. Particularly, when both wheels are visible and detected in the image, de-duplication module 412 may rectify the left and right confusion through the relative position of the front wheels and the back wheels. If the abscissa of the centroid of a front wheel is less than the abscissa of the centroid of a rear wheel, de-duplication module 412 may determine a left side of the vehicle is present in the image. This scenario where the left-right confusion is rectified through the relative position of front and back wheels is shown in 1020 of FIG. 10B. Once the anchor parts are identified/corrected accordingly, de-duplication module 412 may tag the damage instances to the identified/corrected anchor parts.

Based on (I) the anchor parts that a damage instance is tagged to and (II) the relative location of the centroid of the damage instance from the centroid of the anchor parts, de-duplication module 412 may identify duplicate instances. In some embodiments, de-duplication module 412 may formulate one or more similarity index(s) based on the information in (I) and (II). A similarity index is an indicator of resemblance between a pair of damage instances. It ranges from zero to one. The value of the similarity index is close to one for a pair of duplicate instances, and it is close to zero for unrelated damage instances. De-duplication module 412 computes the similarity index for each of the identified candidate duplicate instances to reliably identify the redundancies.

Figure 10C:
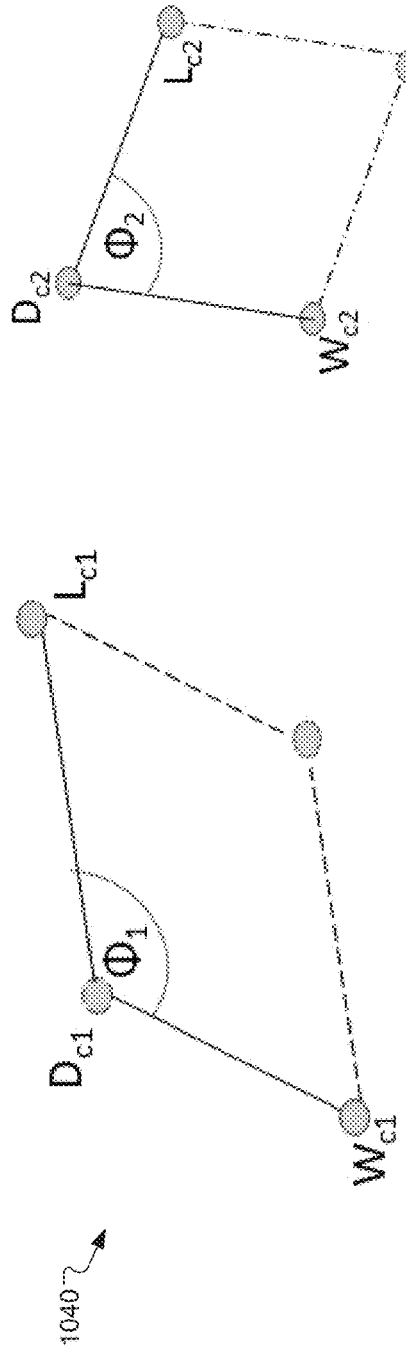
FIG. 10C illustrates a process for formulating a similarity index for a pair of images with candidate duplicate damage instances as shown in FIG. 10A.
Figure 10C:
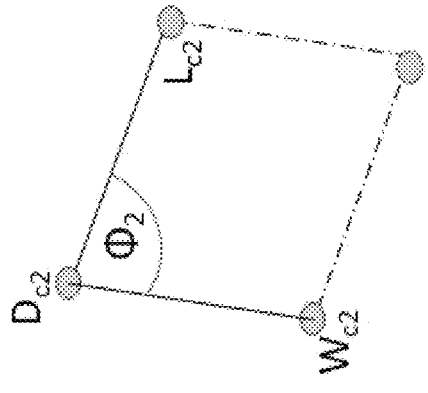
Figure 10C:
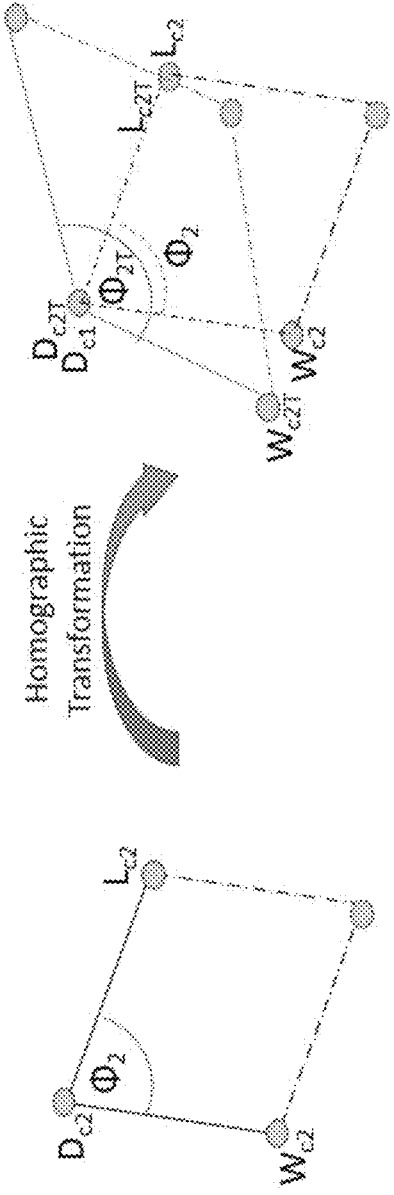
Figure 10D:
FIG. 10D shows example duplicate dent instances resulted from duplicate instance identification, according to some embodiments.
Figure 10D:
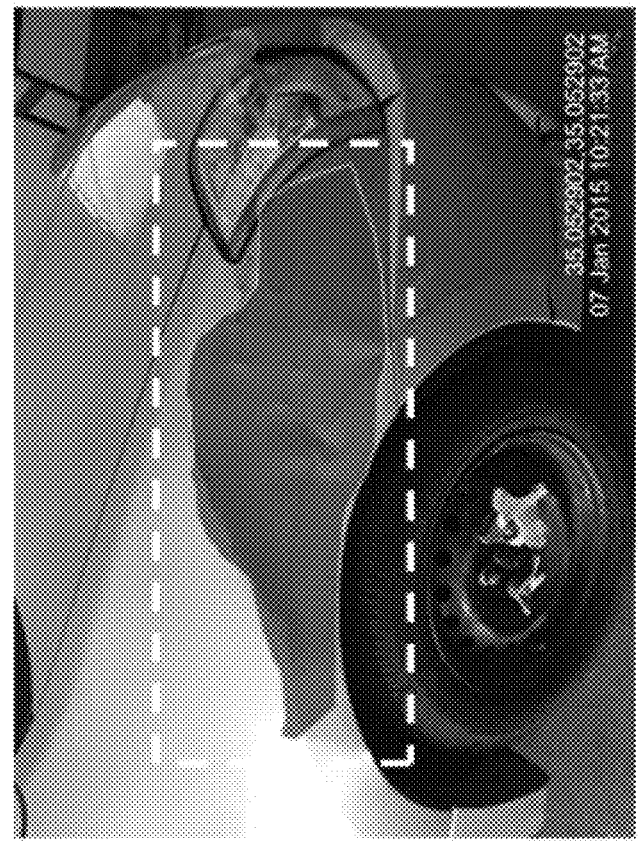

FIG. 10C illustrates a process 1040 for formulating a similarity index for the pair of images shown in FIG. 10A, where the pair of images include candidate duplicate damage instances 1002_1 and 1002_2. The similarity index is used to determine whether 1002_1 and 1002_2 are actually duplicates. De-duplication module 412 may first determine the respective centroids of the damage instance and the anchor parts segmented in both the images containing the candidate duplicate instances, and captures the angle made by the centroid of two anchor parts with the centroid of the damage instance. For example, de-duplication module 412 may capture an angle $\Phi_1$ for image (a) in FIG. 10A. The angle $\Phi_1$, as shown in (a) of FIG. 10C, is created by the centroid of anchor parts, i.e., wheel $W_{C1}$ and headlight $L_{C1}$ at damage centroid $D_{C1}$. Similarly, de-duplication module 412 may use the centroids of damage instance $D_{C2}$, headlight $L_{C2}$, and wheel $W_{C2}$ to obtain an angle $\Phi_2$ in (b) of FIG. 10C for image (b) of FIG. 10A.

Next, de-duplication module 412 may leverage the three points in the respective images to create a parallelogram by projecting a fourth point as shown in (c) of FIG. 10C. De-duplication module 412 may use the two sets of four points for a 4-point homographic transformation from one of the images of the pair to the other. The homographic transformation shows how the perceived objects change when the viewpoint of the observer changes. Based on the transformation, the centroid of the part and damage segmentation maps of the transformed image are obtained, which results in a transformed angle $\Phi_{2T}$. De-duplication module 412 measures the angular difference d between angle $\Phi_1$ of the first image (i.e., image (a) in FIG. 10A) and the angle $\Phi_{2T}$ of the transformed image (i.e., transformed image (b) of FIG. 10A), and computes the similarity index s as follows:

$$s = 1 - (d/180)$$

Here, d=abs ($\Phi_1 - \Phi_{2T}$), the absolute value of the angular difference. In the example of FIG. 10C, the values of $\Phi_1$ and $\Phi_{2T}$ are found to be 113 and 117 degrees respectively. The angle difference is normalized over 180 degrees instead of over 360 degrees since the order of anchor parts is irrelevant. The difference d is 4 degrees. Thus, the similarity index s is calculated to be 0.978, which indicates a high degree of similarity between the two instances. In other words, the damages instances 1002_1 and 1002_2 captured in (a) and (b) of FIG. 10A may be duplicate instances of the same damage/dent, and this dent is shown in different perspectives in FIG. 10D.

Figure 10E:
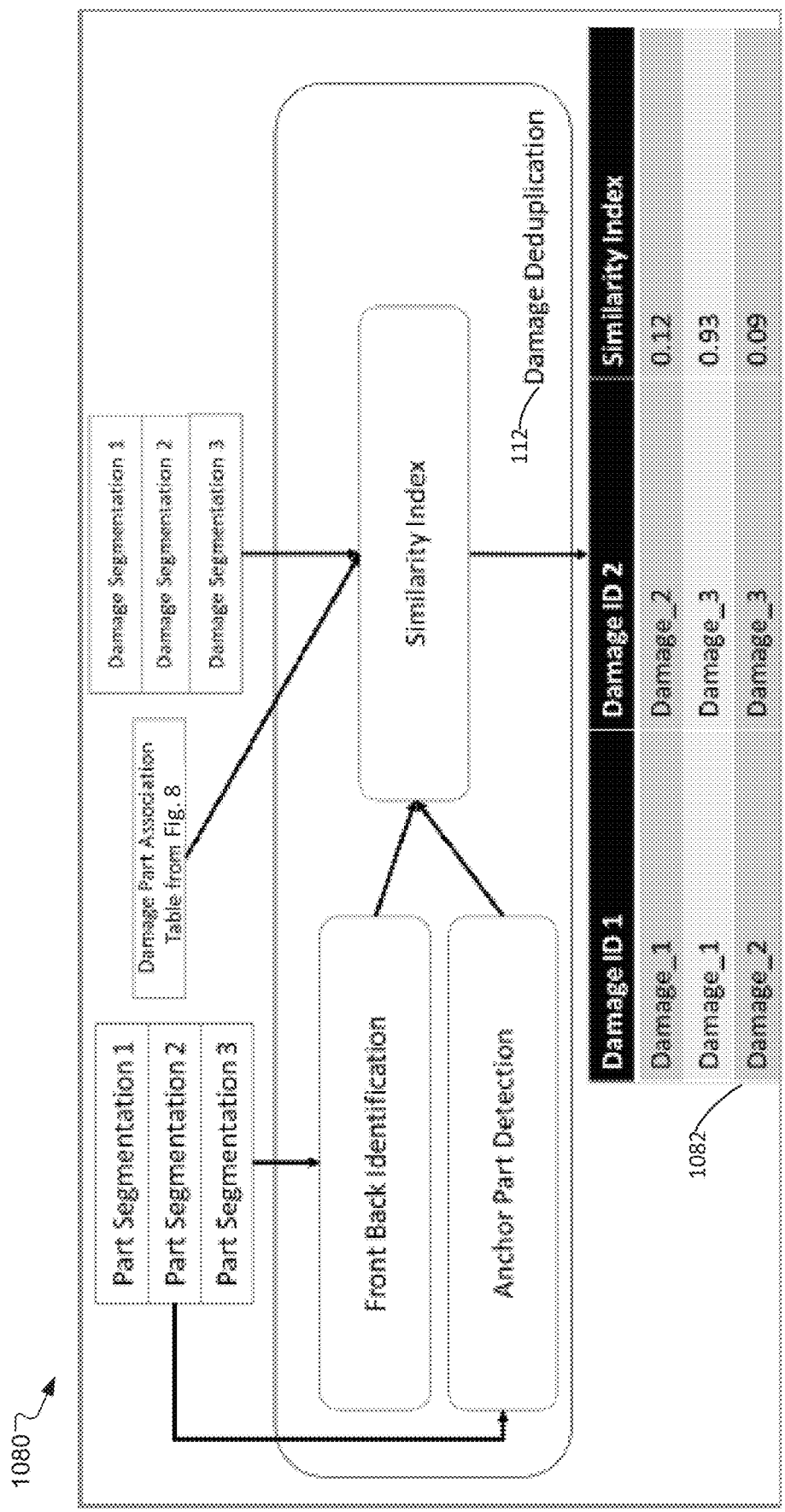
FIG. 10E illustrates an exemplary dimension detection procedure as shown in FIG. 1, according to some embodiments.

FIG. 10E illustrates an exemplary dimension detection procedure 1080 in stage 112 of FIG. 1, according to some embodiments. As depicted, part segmentations obtained from object detection module 404 (e.g., 656 in FIG. 6B), damage segmentations obtained from damage detection module 406 (e.g., 756 in FIG. 7B), as well as the association information obtained from consolidation module 408 (e.g., 806 in FIG. 8) are inputted to de-duplication module 412. As a response, de-duplication module 412 performs front back identification and anchor part detection, and computes a similarity index as described in FIGS. 10A-10D. The output from the operations of de-duplication module 412 is shown in table 1082, where three candidate damage instances are compared with each other and respective similarity index between each pair is computed.

Ensemble Output

Figure 11:
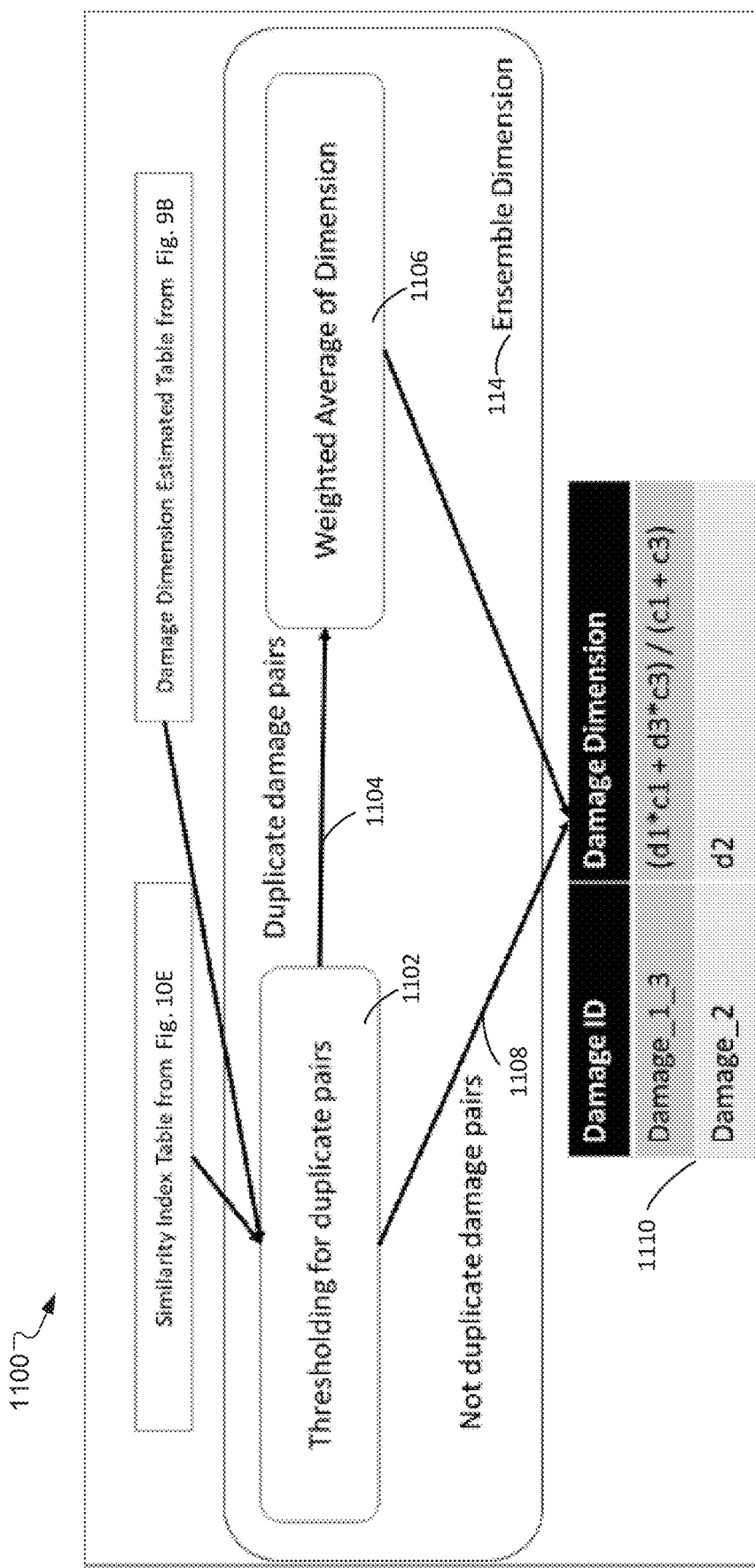
FIG. 11 illustrates an exemplary dimension ensemble procedure as shown in FIG. 1, according to some embodiments.

Based on the damage dimension determined for each candidate damage instance and the similarity index used for filtering out the duplicate damage instance(s) from the candidate damage instances, an accurate dimension for each unique damage to a vehicle may be generated. In some embodiments, ensemble module 414 as shown in FIG. 4 calculates a final dimension for each damage, which is usually performed at stage 114 in FIG. 1. In this stage, the dimension estimates are refined by ensembling multiple estimates generated from different images after de-duplication. This process is also detailed in FIG. 11. As depicted in FIG. 11, the similarity index (e.g., in table 1082 of FIG. 10E) and damage dimensions of the damages along with confidence scores (e.g., in table 952 of FIG. 9B) are inputted to ensemble module 414 for calculating the accurate dimension for each unique damage. In some embodiments, based on the similarity index of each pair of possible duplicates, ensemble module 414 sets up a threshold (e.g., 0.6) to classify the pair of damages as duplicate or not duplicate, as shown in 1102. If the similarity index is above the threshold, the pair of damages are duplicates. For example, as shown in table 1082 of FIG. 10E, instance damage_1 and instance damage_3 have a similarity index of 0.93, which indicates that these instances are actually duplicated, or they represent the same damage. Instance damage_2 has a respective similarity index of 0.12 and 0.09 with instance damage_1 and instance damage_3, which shows that this instance represents a damage different from the damage represented by instance damage_1 and instance damage_3.

If the duplicate pairs of damages are in fact identified in 1104, ensemble module 414 needs to perform aggregation to generate an accurate dimension of each unique damage. Since the duplication exists, the inputted damage dimensions include multiple dimension estimates for multiple damage instances of the same damage, ensemble module 414 may then compute a weighted average based on each of multiple dimension estimates and corresponding confidence scores as an accurate dimension for the damage in 1106. However, if no duplication is found in 1108, i.e., a damage instance is considered to be unique and has a dimension determined, ensemble module 414 will take the one determined dimension as the actual damage dimension for the damage. For example, suppose the dimension and confidence estimated for image (a) in FIG. 10A are d1 and c1 respectively and those of image (b) in FIG. 10A are d2 and c2 respectively. Since these two instances of dents have been determined to be duplicates, ensemble module 414 may perform the weighted average to obtain the final dimension D as below:

$$D=(d1 \times c1+d2 \times c2)/(c1+c2)$$

Here, D is the final dimension for the dent shown in FIG. 10A. The final dimension results are also shown in table 1110 of FIG. 11. The dimension of damage 1_3 is generated based on combining the two-dimension estimates of damage_1 and damage_3 because these two damage instances are duplicated as indicated by the similarity index in FIG. 10E, while the dimension of damage_2 is the single dimension estimate of damage_2 as this damage instance is not redundant as compared to other instances as reflected by the corresponding similarity indexes in FIG. 10E. It should be noted that the approach (e.g., weighted average) to ensemble can be altered; however, the idea of aggregating the dimensions to obtain an accurate dimension estimate for duplicate damages remains unchanged.

Figure 12:
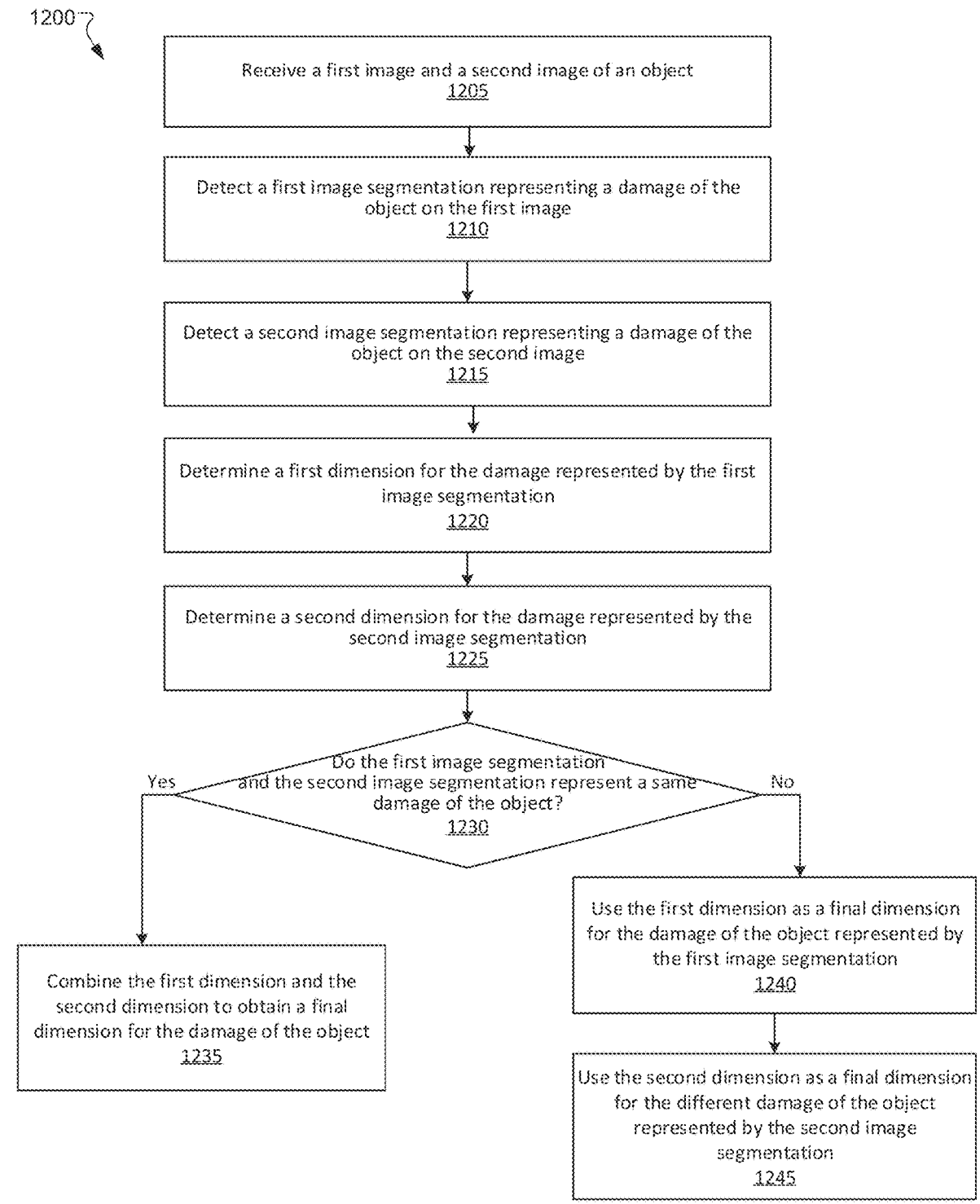
FIG. 12 illustrates an exemplary dimension estimating process, according to some embodiments.

FIG. 12 illustrates an exemplary dimension estimating process 1200, according to some embodiments. In some embodiments, dimension estimation application 322 of server 320 as depicted in FIG. 4 in communication with other components of system 300 to implement process 1200. At step 1205, dimension estimation application 322 receives a first image and a second image of an object. The object may be a vehicle, a boat, or other structures. The images may be taken by a user using a handheld device in an uncontrolled environment. At step 1210, dimension estimation application 322 detects a first image segmentation representing a damage of the object on the first image. At step 1215, dimension estimation application 322 detects a second image segmentation representing a damage of the object on the second image. For example, dimension estimation application 322 may use a first machine learning system trained to perform image segmentation to detect the image segmentations. At step 1220, dimension estimation application 322 determines a first dimension for the damage represented by the first image segmentation. At step 1225, dimension estimation application 322 determines a second dimension for the damage represented by the second image segmentation. In some embodiments, dimension estimation application 322 estimates the physical dimensions and confidence/confidence score based on a view of the visible object in the images. Dimension estimation application 322 may use a second machine learning system trained to perform dimension estimation to obtain the first and second dimensions.

At step 1230, dimension estimation application 322 determines whether the first image segmentation and the second image segmentation represent a same damage of the object based on a similarity index between the first image segmentation and the second image segmentation. If it is determined that the first image segmentation and the second image segmentation represent the same damage of the object, at step 1235, dimension estimation application 322 combines the first dimension and the second dimension to obtain a final dimension for the damage of the object. However, if it is determined that the first image segmentation and the second image segmentation do not represent the same damage of the object, dimension estimation application 322 then directly uses the first dimension as a final dimension for the damage of the object represented by the first image segmentation at step 1240, and uses the second dimension as a final dimension for the different damage of the object represented by the second image segmentation at step 1245.

Figure 13:
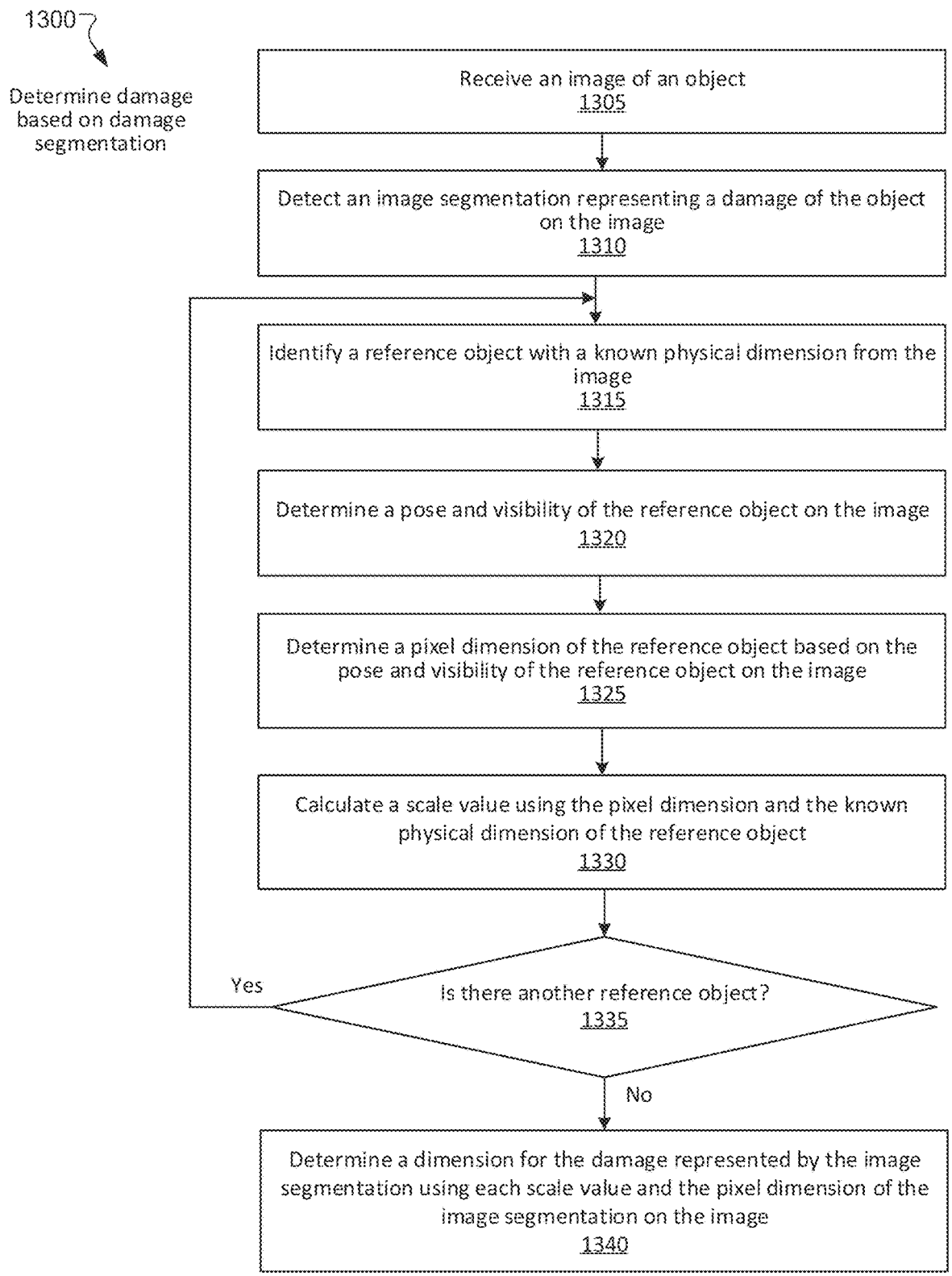
FIG. 13 illustrates an exemplary process for estimating a physical dimension for a damage represented by each damage segmentation on each image, according to some embodiments.

FIG. 13 illustrates an exemplary process 1300 for estimating a physical dimension for a damage represented by each damage segmentation on each image, according to some embodiments. In some embodiments, dimension estimation application 322 of server 320 as depicted in FIG. 4 in communication with other components of system 300 to implement process 1300. At step 1305, dimension estimation application 322 receives an image of an object. The object may be a vehicle, a boat or other structures. At step 1310, dimension estimation application 322 detects an image segmentation representing a damage of the object on the image. At step 1315, dimension estimation application 322 identifies a reference object with a known physical dimension from the image. In some embodiments, dimension estimation application 322 may identify a vehicle part or using a wheel as the reference object. At step 1320, dimension estimation application 322 determines a pose and visibility of the reference object on the image. In some embodiments, dimension estimation application 322 may determine various categories such as frontal pose-full visibility, frontal pose-partial visibility, tilted pose-full visibility, tilted pose-partial visibility, etc., and identify the pose and visibility based on the determined categories. In some embodiments, dimension estimation application 322 may also determine multiple wheels visibility. At step 1325, dimension estimation application 322 determines a pixel dimension of the reference object based on the pose and visibility of the reference object on the image. For example, if the reference object (e.g., wheel) is of frontal pose-partial visibility, dimension estimation application 322 may reconstruct the wheel using Hough Circles and get the corresponding radius of the wheel in pixels. At step 1330, dimension estimation application 322 calculates a scale value for a scale using the pixel dimension and the known physical dimension of the reference object. At step 1335, dimension estimation application 322 determines whether there is another reference object in the image. If the other reference object is found in the image, process 1300 returns back to step 1315 to calculate another value for the scale. The values of the scale determined based on different reference objects may be different. Once each reference object in the image has been used for scale calculation, at step 1340, dimension estimation application 322 determines a dimension for the damage represented by the image segmentation using each scale value and a pixel dimension of the image segmentation on the image. For example, the dimension may be a weighted average based on the scale values and the pixel dimension. Advantageously, the accuracy of the damage dimension estimation is increased based on finding multiple reference objects within one image and ensembling the objects for the estimation.

Figure 14:
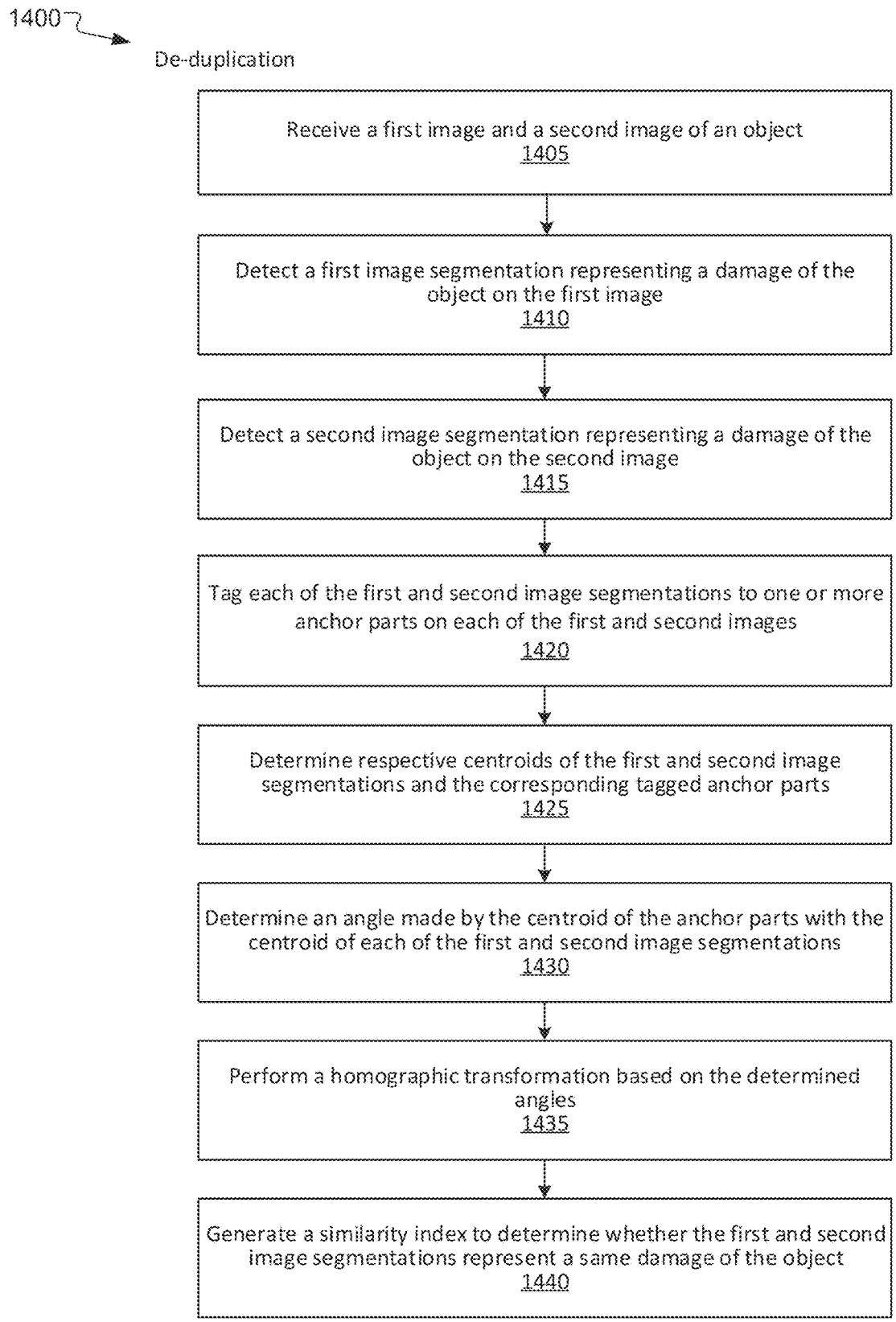
FIG. 14 illustrates an exemplary duplication identification process, according to some embodiments.

FIG. 14 illustrates an exemplary duplication identification process 1400, according to some embodiments. In some embodiments, dimension estimation application 322 of server 320 as depicted in FIG. 4 in communication with other components of system 300 to implement process 1400. At step 1405, dimension estimation application 322 receives a first image and a second image of an object. At step 1410, dimension estimation application 322 detects a first image segmentation representing a damage of the object on the first image. At step 1415, dimension estimation application 322 detects a second image segmentation representing a damage of the object on the second image. At step 1420, dimension estimation application 322 tags each of the first and second image segmentations to one or more anchor parts on each of the first and second images. At step 1425, dimension estimation application 322 determines respective centroids of the first and second image segmentations and the corresponding tagged anchor parts. At step 1430, dimension estimation application 322 determines an angle made by the centroid of the anchor parts with the centroid of each of the first and second image segmentations. At step 1435, dimension estimation application 322 performs a homographic transformation based on the determined angles. At step 1435, dimension estimation application 322 generates a similarity index to determine whether the first and second image segmentations represent a same damage of the object. A similarity index is an indicator of resemblance between a pair of damage instances. It ranges between zero to one. The value of the similarity index is close to if the first and second image segments are considered to be duplicates, while it is close to zero for unrelated image segments/damage instances. The similarity index is computed to reliably identify the redundancies.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for dimension estimation based on duplicate instance identification, the method comprising:
   receiving a set of images of an object;
   detecting, using a first machine learning system trained to perform image segmentation, from a first image in the set of images, a first image segmentation representing a damage of the object on the first image;
   detecting, using the first machine learning system trained to perform image segmentation, from a second image in the set of images, a second image segmentation representing a damage of the object on the second image;
   determining, using a second machine learning system trained to perform dimension estimation, a first dimension for the damage represented by the first image segmentation and a second dimension for the damage represented by the second image segmentation;
   determining whether the first image segmentation and the second image segmentation represent a same damage of the object based on a similarity index between the first image segmentation and the second image segmentation; and
   responsive to determining that the first image segmentation and the second image segmentation represent the same damage, intelligently combining the first dimension and the second dimension to obtain a final dimension for the damage of the object.

2. The method of claim 1, further comprising:
   responsive to determining that the first image segmentation and the second image segmentation do not represent the same damage,
   using the first dimension as a final dimension for the damage of the object represented by the first image segmentation; and
   using the second dimension as a final dimension for the different damage of the object represented by the second image segmentation.

3. The method of claim 1, further comprising:
   detecting, using the first machine learning system trained to perform image segmentation, from a third image in the set of images, a third image segmentation representing a damage of the object on the third image;
   determining, using the second machine learning system trained to perform the dimension estimation, a third dimension for the damage represented by the third image segmentation;
   determining that the first, second, and third image segmentations represent the same damage; and
   combining the first, second, and third dimensions to obtain the final dimension for the damage of the object.

4. The method of claim 1, wherein determining the first dimension for the damage represented by the first image segmentation comprises:
   identifying a reference object with a known physical dimension from the first image;
   determining, based on a set of pose and visibility categories, a pose and visibility of the reference object on the first image;
   determining a pixel dimension of the reference object based on the pose and visibility of the reference object on the first image;

calculating a scale value using the pixel dimension and the known physical dimension of the reference object; and determining the first dimension using the scale value and a pixel dimension of the first image segmentation on the first image.

5. The method of claim 4, further comprising training the second machine learning system to classify image segmentations including the reference object to determine the set of pose and visibility categories.

6. The method of claim 4, wherein the object is a vehicle and the reference object is a wheel of the vehicle.

7. The method of claim 1, further comprising:
tagging the first image segmentation to one or more anchor parts on the first image based on a relative location between the first image segmentation and the one or more anchor parts on the first image;
tagging the second image segmentation to one or more anchor parts on the second image based on a relative location between the second image segmentation and the one or more anchor parts on the second image; and
generating the similarity index between the first image segmentation and the second image segmentation based on the tagging of the first and second image segmentation to the corresponding anchor parts.

8. The method of claim 7, wherein generating the similarity index comprises performing a four-point homographic transformation.

9. The method of claim 7, further comprising:
comparing the similarity index to a threshold; and
wherein determining whether the first image segmentation and the second image segmentation represent the same damage of the object is based on whether the similarity index exceeds the threshold.

10. The method of claim 1, wherein determining the first dimension and the second dimension comprises determining a corresponding confidence score for each dimension, and wherein combining the first dimension and the second dimension to obtain the final dimension for the damage of the object comprises generating a weighted average of the first dimension, the second dimension, and the corresponding confidence score.

11. The method of claim 1, wherein, prior to receiving the set of images of the object, the method further comprises:
receiving a plurality of images captured in an uncontrolled environment; and
using a third machine learning system, trained to perform image relevance filtering, removing one or more irrelevant images from the plurality of images to obtain the set of images of the object, wherein an irrelevant image includes at least one of an image without a view of the object or an image that is too zoomed-in to have an object part recognized from a context of the image.

12. The method of claim 1, further comprising using a fourth machine learning system, trained to perform part detection, identifying different parts of the object from each of the first and second images of the object.

13. The method of claim 12, further comprising:
using a fifth machine learning system, trained to perform damage-to-part association, associating each of the first and second image segmentation to the identified parts of the object; and
wherein determining the first and second dimensions and determining whether the first image segmentation and the second image segmentation represent the same damage are based on associating each of the first and second image segmentation to the identified parts of the object.

14. A system for dimension estimation based on duplicate instance identification, the system comprising:
a processor; and
a memory in communication with the processor and comprising instructions which, when executed by the processor, program the processor to:
receive a set of images of an object;
detect, using a first machine learning system trained to perform image segmentation, from a first image in the set of images, a first image segmentation representing a damage of the object on the first image;
detect, using the first machine learning system trained to perform image segmentation, from a second image in the set of images, a second image segmentation representing a damage of the object on the second image;
determine, using a second machine learning system trained to perform dimension estimation, a first dimension for the damage represented by the first image segmentation and a second dimension for the damage represented by the second image segmentation;
determine whether the first image segmentation and the second image segmentation represent a same damage of the object based on a similarity index between the first image segmentation and the second image segmentation; and
responsive to determining that the first image segmentation and the second image segmentation represent the same damage, intelligently combine the first dimension and the second dimension to obtain a final dimension for the damage of the object.

15. The system of claim 14, wherein the instructions further program the processor to:
responsive to determining that the first image segmentation and the second image segmentation do not represent the same damage,
use the first dimension as a final dimension for the damage of the object represented by the first image segmentation; and
use the second dimension as a final dimension for the different damage of the object represented by the second image segmentation.

16. The system of claim 14, wherein the instructions further program the processor to:
detect, using the first machine learning system trained to perform image segmentation, from a third image in the set of images, a third image segmentation representing a damage of the object on the third image;
determine, using the second machine learning system trained to perform the dimension estimation, a third dimension for the damage represented by the third image segmentation;
determine that the first, second, and third image segmentations represent the same damage; and
combine the first, second, and third dimensions to obtain the final dimension for the damage of the object.

17. The system of claim 14, wherein to determine the first dimension for the damage represented by the first image segmentation, the instructions further program the processor to:
identify a reference object with a known physical dimension from the first image;

determine, based on a set of pose and visibility categories, a pose and visibility of the reference object on the first image;
determine a pixel dimension of the reference object based on the pose and visibility of the reference object on the first image;
calculate a scale value using the pixel dimension and the known physical dimension of the reference object; and
determine the first dimension using the scale value and a pixel dimension of the first image segmentation on the first image.

18. The system of claim 17, wherein the instructions further program the processor to train the second machine learning system to classify image segmentations including the reference object to determine the set of pose and visibility categories.

19. The system of claim 17, wherein the object is a vehicle and the reference object is a wheel of the vehicle.

20. A computer program product for dimension estimation based on duplicate instance identification, the computer program product comprising a non-transitory computer-readable medium having computer readable program code stored thereon, the computer readable program code configured to:
receive a set of images of an object;
detect, using a first machine learning system trained to perform image segmentation, from a first image in the set of images, a first image segmentation representing a damage of the object on the first image;
detect, using the first machine learning system trained to perform image segmentation, from a second image in the set of images, a second image segmentation representing a damage of the object on the second image;
determine, using a second machine learning system trained to perform dimension estimation, a first dimension for the damage represented by the first image segmentation and a second dimension for the damage represented by the second image segmentation;
determine whether the first image segmentation and the second image segmentation represent a same damage of the object based on a similarity index between the first image segmentation and the second image segmentation; and
responsive to determining that the first image segmentation and the second image segmentation represent the same damage, intelligently combine the first dimension and the second dimension to obtain a final dimension for the damage of the object.

* * * * *